US010389897B2

(12) United States Patent
Imai

(10) Patent No.: US 10,389,897 B2
(45) Date of Patent: Aug. 20, 2019

(54) LIGHT SCANNING APPARATUS WITH OVERLAPPED HOLDERS FOR LIGHT SOURCES, AND IMAGE FORMING APPARATUS THEREWITH

(71) Applicant: CANON KABUSHIKI KAISHA, Tokyo (JP)

(72) Inventor: Yuichiro Imai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/889,045

(22) Filed: Feb. 5, 2018

(65) Prior Publication Data

US 2018/0234565 A1 Aug. 16, 2018

(30) Foreign Application Priority Data

Feb. 15, 2017 (JP) ................................ 2017-025996

(51) Int. Cl.

| | |
|---|---|
| ***H04N 1/00*** | (2006.01) |
| ***H04N 1/028*** | (2006.01) |
| ***H04N 1/29*** | (2006.01) |
| ***G03G 15/04*** | (2006.01) |
| ***G03G 15/16*** | (2006.01) |

(Continued)

(52) U.S. Cl.

CPC ....... *H04N 1/00525* (2013.01); *G02B 26/123* (2013.01); *G02B 26/124* (2013.01); *G02B 26/127* (2013.01); *G03G 15/043* (2013.01); *G03G 15/04072* (2013.01); *G03G 15/1605* (2013.01); *H04N 1/0283* (2013.01);

(Continued)

(58) Field of Classification Search

CPC ................................................ H04N 1/00525
USPC ........................................................... 399/4
See application file for complete search history.

(56) References Cited

U.S. PATENT DOCUMENTS

| | | | | |
|---|---|---|---|---|
| 7,072,087 | B2 | 7/2006 | Nakahata | 359/204.1 |
| 7,298,390 | B2 | 11/2007 | Nakahata | 347/231 |

(Continued)

FOREIGN PATENT DOCUMENTS

| | | |
|---|---|---|
| EP | 0709707 | 5/1996 |
| EP | 3125016 | 2/2017 |

(Continued)

OTHER PUBLICATIONS

U.S. Appl. No. 15/702,219, filed Sep. 12, 2017.

(Continued)

*Primary Examiner* — Quana Grainger
(74) *Attorney, Agent, or Firm* — Venable LLP

(57) ABSTRACT

A light scanning apparatus including: a first holder attached to a housing and configured to hold a first laser light source; a second holder attached to the housing and configured to hold a second laser light source; and a lens to which the laser lights are first incident, wherein the first holder and the second holder are attached to the housing in mutually different positions in a rotation axis direction of a rotary polygon mirror and in an optical axis direction of the lens, so that a first incident light path from the first laser light source to the rotary polygon mirror is placed between a second incident light path from the second laser light source to the rotary polygon mirror and the lens, and the first holder and the second holder overlap one another in the rotation axis direction.

17 Claims, 12 Drawing Sheets

(51) Int. Cl.
*G03G 15/043* (2006.01)
*H04N 1/031* (2006.01)
*G02B 26/12* (2006.01)
*G02B 7/182* (2006.01)

(52) U.S. Cl.
CPC ............. *H04N 1/0312* (2013.01); *H04N 1/29* (2013.01); *G02B 7/182* (2013.01); *H04N 2201/0094* (2013.01)

(56) References Cited

U.S. PATENT DOCUMENTS

| | | | | |
|---|---|---|---|---|
| 7,522,326 | B1 | 4/2009 | Otoguro | 347/256 |
| 7,629,992 | B2 | 12/2009 | Nakahata | 347/243 |
| 7,684,099 | B2 | 3/2010 | Otoguro | 359/216.1 |
| 7,728,861 | B2 | 6/2010 | Nakahata | 347/231 |
| 7,830,576 | B2 | 11/2010 | Nakahata | 359/201.1 |
| 8,810,622 | B2 | 8/2014 | Mamiya et al. | 347/242 |
| 8,917,305 | B2 | 12/2014 | Nakahata et al. | 347/244 |
| 8,922,847 | B2 | 12/2014 | Nakahata | 358/474 |
| 8,947,478 | B2 | 2/2015 | Ishidate et al. | 347/137 |
| 9,086,645 | B2 | 7/2015 | Otoguro et al. | G03G 15/0435 |
| 9,195,063 | B2 | 11/2015 | Ishidate et al. | G02B 26/125 |
| 9,250,440 | B2 | 2/2016 | Miyatake | G02B 26/125 |
| 9,316,992 | B2 | 4/2016 | Ishidate et al. | G03G 15/04036 |
| 9,400,444 | B2 | 7/2016 | Sato et al. | G03G 15/043 |
| 9,493,014 | B2 | 11/2016 | Aruga et al. | B41J 2/471 |
| 9,517,638 | B2 | 12/2016 | Otoguro et al. | B41J 2/471 |
| 9,720,207 | B2 | 8/2017 | Otoguro et al. | G03G 15/0435 |
| 9,772,577 | B2 | 9/2017 | Ishidate et al. | G03G 15/043 |
| 2002/0001118 | A1 | 1/2002 | Nakajima et al. | 359/204 |
| 2009/0244670 | A1 | 10/2009 | Sato et al. | 359/205.1 |
| 2010/0014892 | A1* | 1/2010 | Shimomura | G02B 26/123 399/221 |
| 2011/0222132 | A1 | 9/2011 | Yamashita | 358/474 |
| 2012/0081770 | A1 | 4/2012 | Sato et al. | 359/204.1 |
| 2015/0268463 | A1* | 9/2015 | Matsuo | G02B 26/122 347/118 |
| 2016/0309053 | A1 | 10/2016 | Murotani et al. | H04N 1/02481 |
| 2016/0347083 | A1 | 12/2016 | Ishidate | B41J 2/471 |
| 2017/0010558 | A1 | 1/2017 | Ishidate et al. | B41J 2/47 |
| 2017/0064108 | A1 | 3/2017 | Mamiya et al. | H04N 1/00525 |
| 2017/0336731 | A1 | 11/2017 | Ishidate et al. | G03G 15/0435 |

FOREIGN PATENT DOCUMENTS

| | | |
|---|---|---|
| JP | 2006-251513 | 9/2006 |
| JP | 2013-125041 | 6/2013 |

OTHER PUBLICATIONS

U.S. Appl. No. 15/891,087, filed Feb. 7, 2018.
U.S. Appl. No. 15/891,064, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,071, filed Feb. 7, 2018.
U.S. Appl. No. 15/891,057, filed Feb. 7, 2018.
U.S. Appl. No. 15/889,802, filed Feb. 6, 2018.
U.S. Appl. No. 15/889,052, filed Feb. 5, 2018.
U.S. Appl. No. 15/891,080, filed Feb. 7, 2018.
U.S. Appl. No. 15/908,482, filed Feb. 28, 2018.
U.S. Appl. No. 15/718,510, filed Sep. 28, 2017.
Extended European Search Report dated Jul. 3, 2018, in counterpart European Application No. 18156244.8.

* cited by examiner

LIGHT SCANNING APPARATUS WITH OVERLAPPED HOLDERS FOR LIGHT SOURCES, AND IMAGE FORMING APPARATUS THEREWITH

BACKGROUND OF THE INVENTION

Field of the Invention

The present invention relates to a light scanning apparatus used in an image forming apparatus such as a copy machine, a printer, a facsimile, or a multi-function peripheral.

Description of the Related Art

As a light scanning apparatus used in an image forming apparatus of an electrophotographic printing method, a light scanning apparatus having the following configuration is known in the art. That is, a light spot is formed on a surface of a photosensitive member by deflecting laser light emitted from a light source using a rotary polygon mirror and condensing them onto the photosensitive member using an imaging optical system. The light spot scans on the surface on the photosensitive member so that a latent image is formed on the surface of the photosensitive member.

Inside the light scanning apparatus, a deflector having a rotary polygon mirror is provided for scanning by deflecting the laser light emitted from a semiconductor laser device. A predetermined latent image is obtained on the photosensitive member by scanning the laser light on the photosensitive member using the rotary polygon mirror and repeatedly turning on and off the semiconductor laser device in association with the operation of the photosensitive member.

Japanese Patent Application Laid-Open No. 2013-125041 discusses a light scanning apparatus in which a plurality of semiconductor laser devices are arranged in parallel in a rotation axis direction of the rotary polygon mirror in order to mount a plurality of semiconductor laser devices used as a light source in a single housing.

In order to respond to demands for high image quality and high productivity, it is demanded for a single light source of the light scanning apparatus to provide a plurality of light emitting points (hereinafter, referred to as "multi-beam"). The multi-beam increases a size of the light source. If a plurality of multi-beam light sources are arranged in parallel in the rotation axis direction of the rotary polygon mirror as discussed in Japanese Patent Application Laid-Open No. 2013-125041, a size of the light scanning apparatus also increases in the rotation axis direction of the rotary polygon mirror.

SUMMARY OF THE INVENTION

In view of such circumstances, an object of the invention is to miniaturize the light scanning apparatus in the rotation axis direction of the rotary polygon mirror.

According to an aspect of the invention, there is provided a light scanning apparatus, comprising:

a plurality of optical elements including a mirror and a lens;

a housing configured to house the plurality of optical elements therein;

a first laser light source having a plurality of light emitting points to emit laser lights for exposing a first photosensitive member;

a first holder attached to the housing and configured to hold the first laser light source;

a second laser light source having a plurality of light emitting points to emit laser lights for exposing a second photosensitive member;

a second holder attached to the housing and configured to hold the second laser light source;

a rotary polygon mirror configured to be rotated and provided with a plurality of reflection surfaces by which the laser lights emitted from each of the first laser light source and the second laser light source are deflected; and a lens, of the plurality of optical elements, to which the laser lights emitted from each of the first laser light source and the second laser light source and deflected by the rotary polygon mirror are first incident, wherein the laser lights emitted from each of the first laser light source and the second laser light source are incident to the rotary polygon mirror without being reflected by a mirror, wherein the first holder and the second holder are attached to the housing in mutually different positions in a rotation axis direction of the rotary polygon mirror and in an optical axis direction of the lens, and wherein the first holder and the second holder are attached to the housing so that a first incident light path of the laser lights emitted from the first laser light source and incident to the rotary polygon mirror is placed between a second incident light path of the laser lights emitted from the second laser light source and incident to the rotary polygon mirror and the lens, and a part of the first holder and a part of the second holder overlap one another in the rotation axis direction.

Further features of the present invention will become apparent from the following description of exemplary embodiments with reference to the attached drawings.

DESCRIPTION OF THE EMBODIMENTS

The embodiments of the present invention will now be described in detail in accordance with the accompanying drawings. In the following description, a rotation axis direction of a rotary polygon mirror 42 described below will be referred to as a "Z-axis direction," a longitudinal direction of an optical element will be referred to as a "Y-axis direction," and a direction perpendicular to the Y-axis and Z-axis directions will be referred to as an "X-axis direction." In addition, a rotational direction of the rotary polygon mirror 42 will be referred to as a main scanning direction, and a direction perpendicular to the main scanning direction will be referred to a sub-scanning direction. In this case, a main scanning direction may become in parallel with the Y-axis or Z-axis, and a sub-scanning direction may become in parallel with the Z-axis.

First Embodiment

<Configuration of Image Forming Apparatus>

Figure 1:
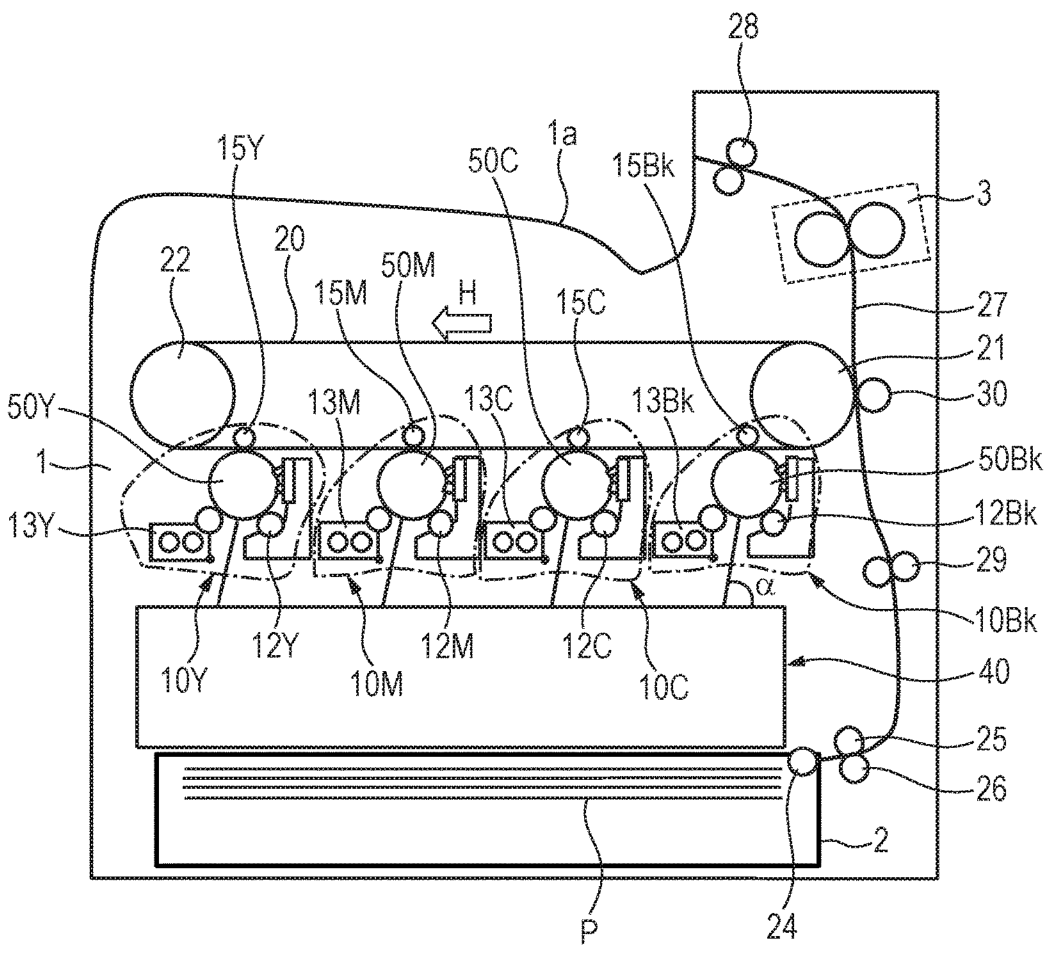
FIG. 1 is a schematic diagram illustrating an image forming apparatus according to a first embodiment.

A configuration of an image forming apparatus according to a first embodiment will be described. FIG. 1 is a schematic diagram illustrating a whole configuration of a tandem type color laser beam printer according to the first embodiment. The laser beam printer (hereinafter, simply referred to as a "printer") has four image forming engines 10Y, 10M, 10C, and 10Bk (indicated by one-dotted chain lines) for forming toner images for each color of yellow Y, magenta M, cyan C, and black Bk. In addition, the printer has an intermediate transfer belt 20 which is a transfer-receiving member to which toner images are transferred from the image forming engines 10Y, 10M, 10C, and 10Bk. Furthermore, the toner images multi-transferred to the intermediate transfer belt 20 are transferred to a recording sheet P as a recording medium to form a full-color image. In the following description, reference symbols representing each color such as Y, M, C, and Bk will be omitted unless necessary.

The intermediate transfer belt 20 is formed in an endless shape and is looped around a pair of belt conveyance rollers 21 and 22. As the intermediate transfer belt 20 is rotated in an arrow direction H, the toner images formed by the image forming engine 10 are transferred. In addition, a secondary transfer roller 30 is arranged oppositely to one of the belt conveyance rollers 21 by interposing the intermediate transfer belt 20. A recording sheet P is inserted between a secondary transfer roller 30 and the intermediate transfer belt 20 pressed to each other, so that the toner images are transferred from the intermediate transfer belt 20. The four image forming engines 10Y, 10M, 10C, and 10Bk described above are arranged in parallel one another under the intermediate transfer belt 20, so that the toner images formed to match image information of each color are transferred to the intermediate transfer belt 20 (hereinafter, referred to as "primary transfer"). The four image forming engines 10 are arranged in order of a yellow image forming engine 10Y, a magenta image forming engine 10M, a cyan image forming engine 10C, and a black image forming engine 10Bk along a rotational direction of the intermediate transfer belt 20 (arrow direction H).

A light scanning apparatus 40 for exposing a photosensitive drum 50 as a photosensitive member provided in each image forming engine 10 depending on the image information is arranged under the image forming engine 10. The photosensitive drums 50Y, 50M, 50C, and 50Bk serve as first, second, third, and fourth photosensitive members, respectively. Note that the light scanning apparatus 40 is not illustrated specifically in FIG. 1, and it will be described in more details with reference to FIGS. 2 to 4. The light scanning apparatus 40 is shared by all of the image forming engines 10Y, 10M, 10C, and 10Bk, and has four semiconductor laser devices (not shown) for emitting laser lights modulated depending on the image information of each color. In addition, the light scanning apparatus 40 has a deflector provided with a rotary polygon mirror 42 rotated fast to deflect each laser light so as to scan the laser lights of four light paths along the rotation axis direction (Y-axis direction) of the photosensitive drum 50 and a scanner motor 41 configured to rotate the rotary polygon mirror 42. The deflector has a rotary polygon mirror 42, a scanner motor 41 serving as a drive unit for driving a motor used to rotate the rotary polygon mirror 42, and a board to which the motor and the scanner motor 41 are mounted. Each laser light scanned by the rotary polygon mirror 42 propagates along a predetermined path while being guided by an optical element provided in the light scanning apparatus 40. In addition, each laser light propagating along a predetermined path is used to expose each photosensitive drum 50 of each image forming engine 10 through each irradiation hole (not shown) provided in an upper part of the light scanning apparatus 40.

Each image forming engine 10 has a photosensitive drum 50 and a charging roller 12 for electrically charging the photosensitive drum 50 to a uniform background voltage. In addition, each image forming engine 10 has a developing device 13 configured to develop an electrostatic latent image formed on the photosensitive drum 50 (photosensitive member) through exposure of the laser light to form a toner image. The developing device 13 forms a toner image depending on image information of each color on the photosensitive drum 50 as a photosensitive member. The developing devices 13Y, 13M, 13C, and 13Bk serve as first, second, third, and fourth developing devices, respectively.

A primary transfer roller 15 is arranged to face the photosensitive drum 50 of each image forming engine 10 by interposing the intermediate transfer belt 20. The primary transfer roller 15 transfers the toner image on the photosensitive drum 50 to the intermediate transfer belt 20 by applying a predetermined transfer voltage. The primary transfer rollers 15Y, 15M, 15C, and 15Bk serve as first, second, third, and fourth transfer members, respectively.

Meanwhile, the recording sheet P is supplied from a feeding cassette 2 housed in a lower part of the printer housing 1 to the inside of the printer, specifically, a secondary transfer position inside of the printer where the intermediate transfer belt 20 and the secondary transfer roller 30 abut on each other. A pickup roller 24 and a feeding roller 25 are juxtaposed in an upper part of the feeding cassette 2 to pick up the recording sheet P stored in the feeding cassette 2. A retardation roller 26 for preventing duplicated delivery of the recording sheet P is arranged to face the feeding roller 25. The conveyance path 27 of the recording sheet P inside the printer is provide substantially vertically along the right side surface of the printer housing 1. The recording sheet P extracted from the feeding cassette 2 positioned in the bottom of the printer housing 1 is lifted along the conveyance path 27 and is fed to a registration roller 29 that controls an entering timing of the recording sheet P into a secondary transfer position. Then, the toner images are transferred to the recording sheet P in the secondary transfer position, which is then fed to a fixing unit 3 (indicated by a dotted line) provided in the downstream side of the conveyance direction. The recording sheet P having the toner images fixed by the fixing unit 3 is discharged to a discharge tray 1*a* provided in an upper part of the printer housing 1 through the discharge roller 28. In formation of a full-color image using the color laser beam printer configured in this manner, first, the light scanning apparatus 40 exposes the photosensitive drums 50 of each image forming engine 10 at predetermined timings depending on image information of each color.

<Light Scanning Apparatus>

Figure 2:
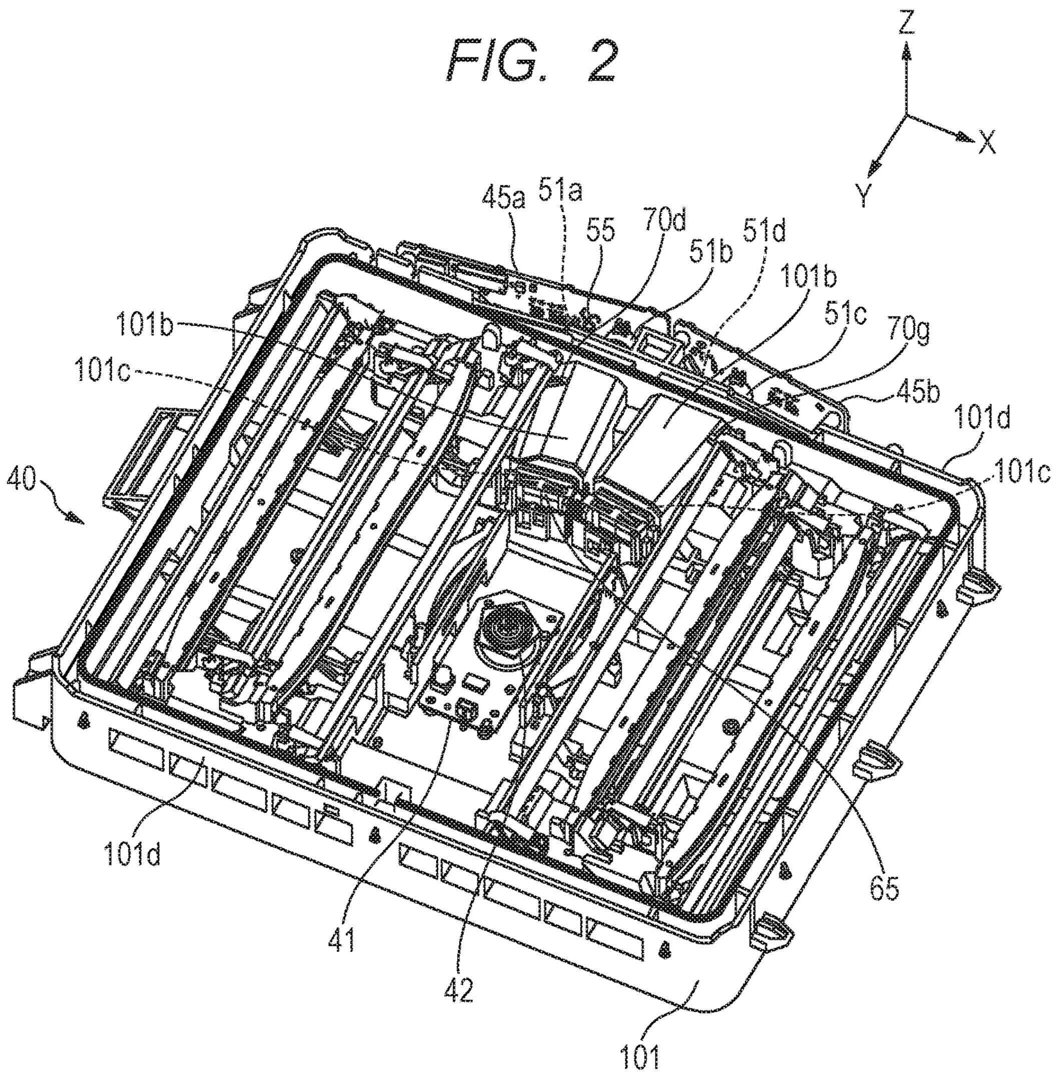
FIG. 2 is a perspective view illustrating the light scanning apparatus according to the first embodiment.

FIG. 2 is a perspective view illustrating the light scanning apparatus 40 by removing an upper cover 69 of the light scanning apparatus 40 (refer to FIG. 4) and exposing the rotary polygon mirror 42 or other optical components. For example, according to the first embodiment, a single image forming engine 10 is provided with a single light source 51 as a light source. Specifically, the image forming engine 10Y corresponds to the light source 51*a* as a first laser light source, and the image forming engine 10M corresponds to the light source 51*b* as a second laser light source. The image forming engine 10C corresponds to the light source 51*c* as a third laser light source, and the image forming engine 10Bk corresponds to the light source 51*d* as a fourth laser light source. In the following description, the subscripts "a" to "d" will be omitted unless necessary. The light source 51 is mounted on the circuit board 45 along with a laser driver (not shown) that drives the light source 51. The circuit board 45 is attached to the side wall portion 101*d* erected from the bottom surface of the housing 101. Specifically, a pair of light sources 51*a* and 51*b* are mounted on the circuit board 45*a*, and a pair of light sources 51*c* and 51*d* are mounted on the circuit board 45*b*. The light sources 51*a* and 51*b* are mounted such that an angular difference is generated between light paths of each laser light emitted from the light sources 51*a* and 51*b* in the main scanning direction and the sub-scanning direction (refer to FIGS. 6 and 7). As illustrated in FIG. 2, a pair of circuit boards 45*a* and 45*b* are attached to the side wall portion 101*d* of the housing 101. The light receiving sensor 55 as a light receiving portion described above is mounted on the circuit board 45*a*. The light receiving sensor 55 generates a synchronization signal.

The rotary polygon mirror 42 that deflects the laser light emitted from the light source 51 and the scanner motor 41 that rotates the rotary polygon mirror 42 are installed on the bottom surface of the housing 101. The laser light emitted from the light source 51 is reflected by the rotary polygon mirror 42, and the laser light reflected by the rotary polygon mirror 42 is directed to the photosensitive drum 50 serving as a surface to be scanned. In addition, the laser light emitted from the light source 51*a* is reflected by the rotary polygon mirror 42 and is directed to the light receiving sensor 55 mounted on the circuit board 45.

It is necessary to constantly maintain the time elapsing until the latent image starts to be formed on the photosensitive drum 50 by the laser light from the timing at which the light receiving sensor 55 receives the laser light. The light receiving sensor 55 is provided to maintain this time constantly. That is, the light receiving sensor 55 is used to determine the timing at which laser lights are emitted from the light sources 51*a* to 51*d*. The light receiving sensor 55 is arranged immediately over the light source 51*a* (chip holder 46*a*) (in the +Z direction) (refer to FIG. 12A). The laser light directed to the light receiving sensor 55 and the laser light emitted from the light source 51*a* have no angular difference in the main scanning direction. Meanwhile, the light scanning apparatus 40 is provided with a plurality of light sources 51. For example, the light sources 51*a* and 51*b* and the light sources 51*c* and 51*d* are provided in the –X side and the +X side with respect to a YZ-plane including the rotation axis of the rotary polygon mirror 42. For example, the light paths of laser lights emitted from a pair of light sources 51*a* and 51*b* in one side have an angular difference p in the main scanning direction (refer to FIG. 6). The light paths of laser lights emitted from a pair of light sources 51*a* and 51*b* have an angular difference in the main scanning direction for the following reasons. Specifically, the light paths of a pair of laser lights have an angular difference in the main scanning direction in order to reduce a sloped incident angle in the sub-scanning direction of the chip holders 46*a* and 46*b* even when the sizes of the chip holders 46*a* and 46*b* described below increase.

Figure 5:
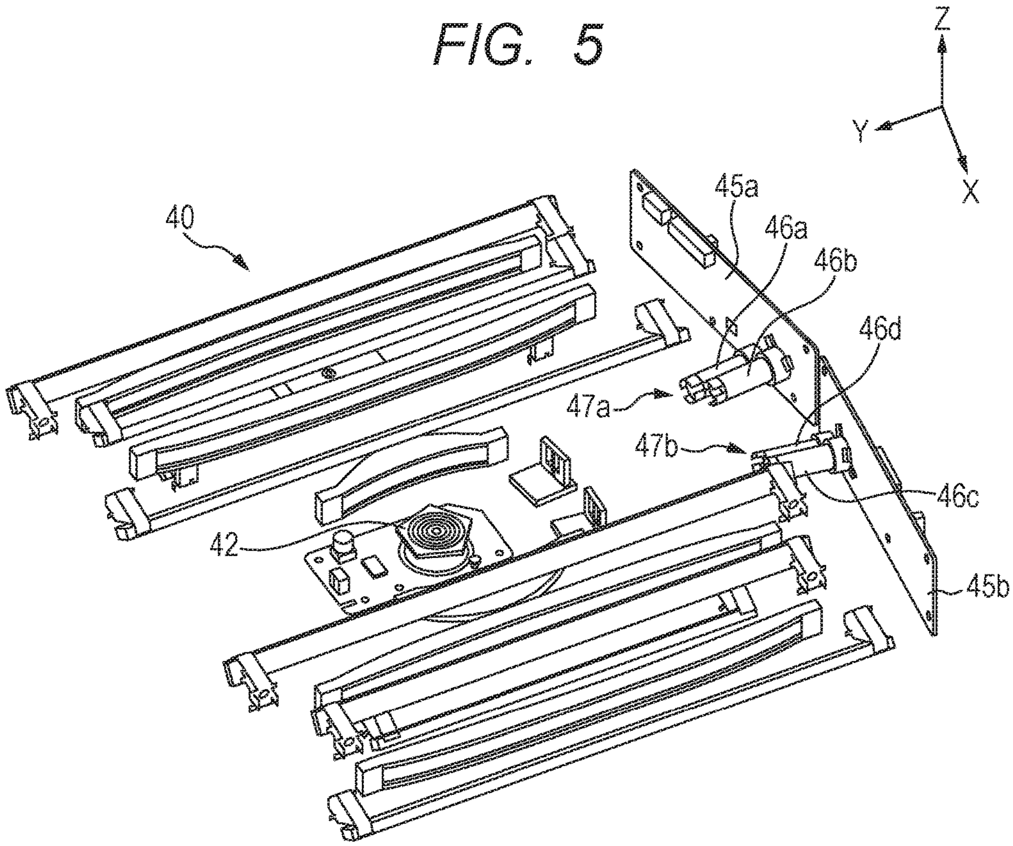
FIG. 5 is a perspective view illustrating main parts of the light scanning apparatus according to the first embodiment.

As the circuit board 45 is attached to the side wall portion 101*d* of the light scanning apparatus 40, the chip holders 46*a* and 46*b* protrude inward of the light scanning apparatus 40 (refer to FIG. 5). For this reason, the housing 101 has a partitioning wall (hereinafter, referred to as a "tubular portion 101*b*") shaped to cover the light source 51. The side wall portion 101*d* of the housing 101 to which the circuit board 45 is attached is provided with an opening 101*c* in order to guide laser light emitted from the light source 51 to the rotary polygon mirror 42. The opening 101*c* connects the inside and the outside of the light scanning apparatus 40 to each other. That is, the external air outside of the light scanning apparatus 40 can enter the inside of the light scanning apparatus 40 through the opening 101*c*. For this reason, the opening 101*c* is necessarily sealed with a sealing member for sealing the opening 101*c*. According to the first embodiment, a cylindrical lens 65 serves as a sealing member for sealing the opening 101*c*. The opening 101*c* is provided in a tip of the tubular portion 101*b* in which the sealing member can be easily installed. The tubular portion 101*b* is a partitioning wall for partitioning the inside and the outside of the light scanning apparatus 40 from each other. The opening 101*c* is provided to allow the laser light emitted from the light source 51*a* to pass from the outside of the housing 101 to the inside of the housing 101. In addition, the opening 101*c* is also provided to allow laser light to pass from the inside of the housing 101 to the outside of the housing 101 in order to allow the light receiving sensor 55 to receive the laser light reflected by the rotary polygon mirror 42. The tubular portion 101*b* is provided with a seat surface 70*d* or 70*g* on which an optical element is mounted.

<Light Path of Laser Light>

Figure 3:
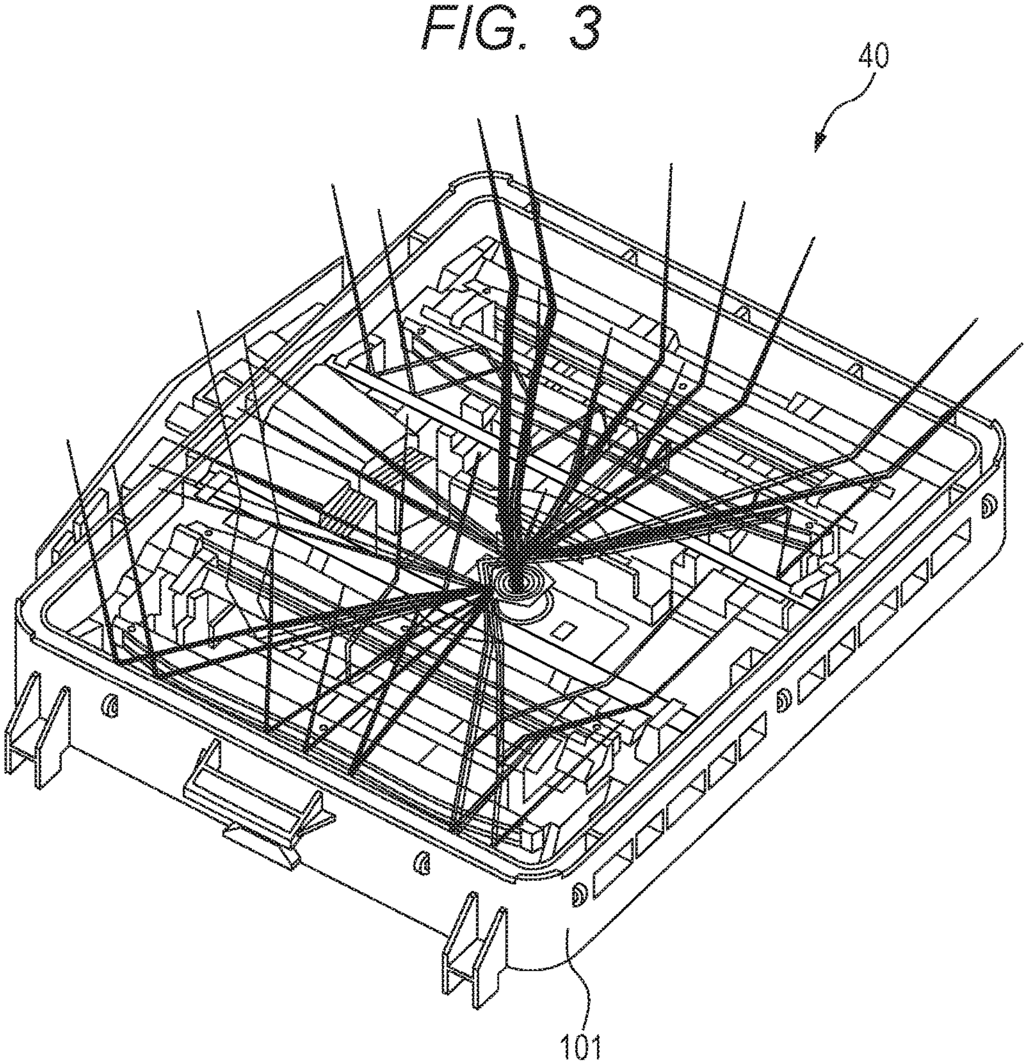
FIG. 3 is a perspective view illustrating light paths of laser lights in the light scanning apparatus according to the first embodiment.
Figure 4:
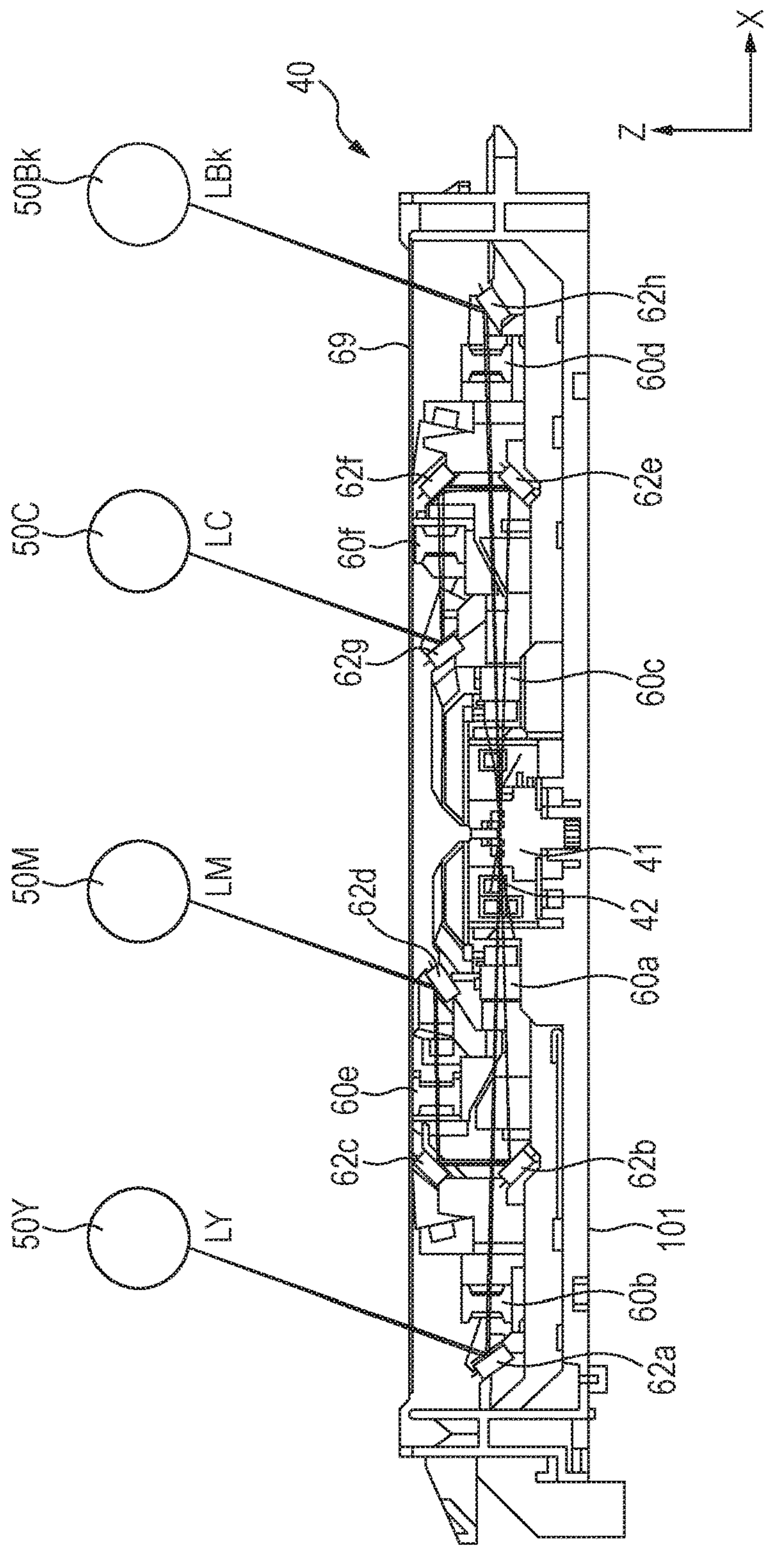
FIG. 4 is a cross-sectional view illustrating light paths of laser lights in the light scanning apparatus according to the first embodiment.

FIG. 3 is a diagram illustrating light paths of laser lights inside the light scanning apparatus 40, in which reference numerals are not illustrated for simplicity purposes. FIG. 3 illustrates light paths of laser lights of four colors in both end portions and a center portion of an image region in the main scanning direction. FIG. 4 is a schematic cross-sectional view illustrating a whole image of the light scanning apparatus 40 to which optical elements are attached. The light scanning apparatus 40 is provided with optical lenses 60*a* to 60*f* for guiding each laser light to the photosensitive drum 50 and focusing them, and reflection mirrors 62*a* to 62*f* as optical elements. The housing 101 internally houses the rotary polygon mirror 42 and the reflection mirrors 62*a* to 62*f*. How the laser lights are guided to the photosensitive drums 50 through the optical lenses 60*a* to 60*f* and the reflection mirrors 62*a* to 62*h* will be described with reference to FIG. 4. The laser light LY emitted from the light source 51*a* and mated with the photosensitive drum 50Y is deflected by the rotary polygon mirror 42 and is incident to the optical lens 60*a*. The laser light LY passing through the optical lens 60*a* is incident to the optical lens 60*b*, passes through the optical lens 60*b*, and is then reflected by the reflection mirror 62*a*. The laser light LY reflected by the reflection mirror 62*a* passes through a transparent window (not shown) and scans the photosensitive drum 50Y.

The laser light LM emitted from the light source 51*b* and mated with the photosensitive drum 50M is deflected by the rotary polygon mirror 42 and is incident to the optical lens 60*a*. The laser light LM passing through the optical lens 60*a* is reflected by the reflection mirrors 62*b* and 62*c*, is incident to the optical lens 60*e*, passes through the optical lens 60*e*, and is then reflected by the reflection mirror 62*d*. The laser light LM reflected by the reflection mirror 62*d* passes through the transparent window (not shown) and scans the photosensitive drum 50M. The optical lens 60*a* is a lens where the laser lights emitted from the light sources 51*a* and 51*b* out of a plurality of optical elements and deflected by the rotary polygon mirror 42 are initially incident.

The laser light LC emitted from the light source 51*c* and mated with the photosensitive drum 50C is deflected by the rotary polygon mirror 42 and is incident to the optical lens 60*c*. The laser light LC passing through the optical lens 60*c* is reflected by the reflection mirrors 62*e* and 62*f* and is incident to the optical lens 60*f*, and the laser light LC passing through the optical lens 60*f* is reflected by the reflection mirror 62*g*. The laser light LC reflected by the reflection mirror 62*g* passes through the transparent window (not shown) and scans the photosensitive drum 50C.

The laser light LBk emitted from the light source 51*d* and mated with the photosensitive drum 50Bk is deflected by the rotary polygon mirror 42 and is incident to the optical lens 60*c*. The laser light LBk passing through the optical lens 60*c* is incident to the optical lens 60*d*, passes through the optical lens 60*d*, and is then reflected by the reflection mirror 62*h*. The laser light LBk reflected by the reflection mirror 62*h* passes through the transparent window (not shown) and scans photosensitive drum 50Bk. The optical lens 60*c* is a lens where the laser lights emitted from the light sources 51*c* and 51*d* out of a plurality of optical elements and deflected by the rotary polygon mirror 42 are initially incident.

<Light Source Unit>

FIG. 5 is a schematic diagram illustrating main parts of the light scanning apparatus 40 by removing some elements such as the housing 101. A light source unit 47 mounted with the light source 51 that emits laser lights is arranged on the side wall portion 101*d* of the light scanning apparatus 40. The light scanning apparatus 40 is internally provided with the rotary polygon mirror 42 that reflects and deflects the laser lights, the optical lens 60 and the reflection mirror 62 necessary to guide the laser lights to the surface to be scanned and form images of the laser lights on the surface. In FIG. 5, some reference numerals are omitted, and this similarly applies to the following drawings.

The laser light deflected and scanned by the rotary polygon mirror 42 passes through the optical lenses 60*a* and 60*c* having strong power in the main scanning direction and is then guided to the optical lenses 60*b*, 60*d*, 60*e*, and 60*f* having strong optical power in the sub-scanning direction (refer to FIG. 4). Then, the laser light reflected by the reflection mirror 62 at least one time is guided to the photosensitive drum 50 as a member to be scanned and is focused on the surface of the photosensitive drum 50 as a surface to be scanned.

A pair of light source units 47*a* and 47*b* are provided on the side wall portion 101*d* of the housing 101. Specifically, the light source unit 47*a* has the light source 51*a* mated with the photosensitive drum 50Y and the light source 51*b* mated with the photosensitive drum 50M, and the light source unit 47*b* has the light source 51*c* mated with the photosensitive drum 50C and the light source 51*d* mated with the photosensitive drum 50Bk. Hereinafter, the subscripts "a" and "b" will be omitted unless necessary. A pair of light source units 47 are provided plane-symmetrically with respect to a plane passing through a rotation axis of the rotary polygon mirror 42 in parallel with the YZ-plane. A single light source 51 has a plurality of light emitting points such as eight (or four) light emitting points, and eight (or four) laser lights are emitted from a single light source. For this reason, the size of the light source 51 increases, compared to a light source having, for example, a single light emitting point. The light emitting point of the laser light can be reduced to be equal to or smaller than 1 mm even when the number of emitted laser lights increases. However, a size of the component consisting of an electrical connection part for driving a plurality of light emitting points increases. For this reason, a packaging size of the light source having a plurality of light emitting points increases as a result.

<Arrangement of Light Source>

Figure 6:
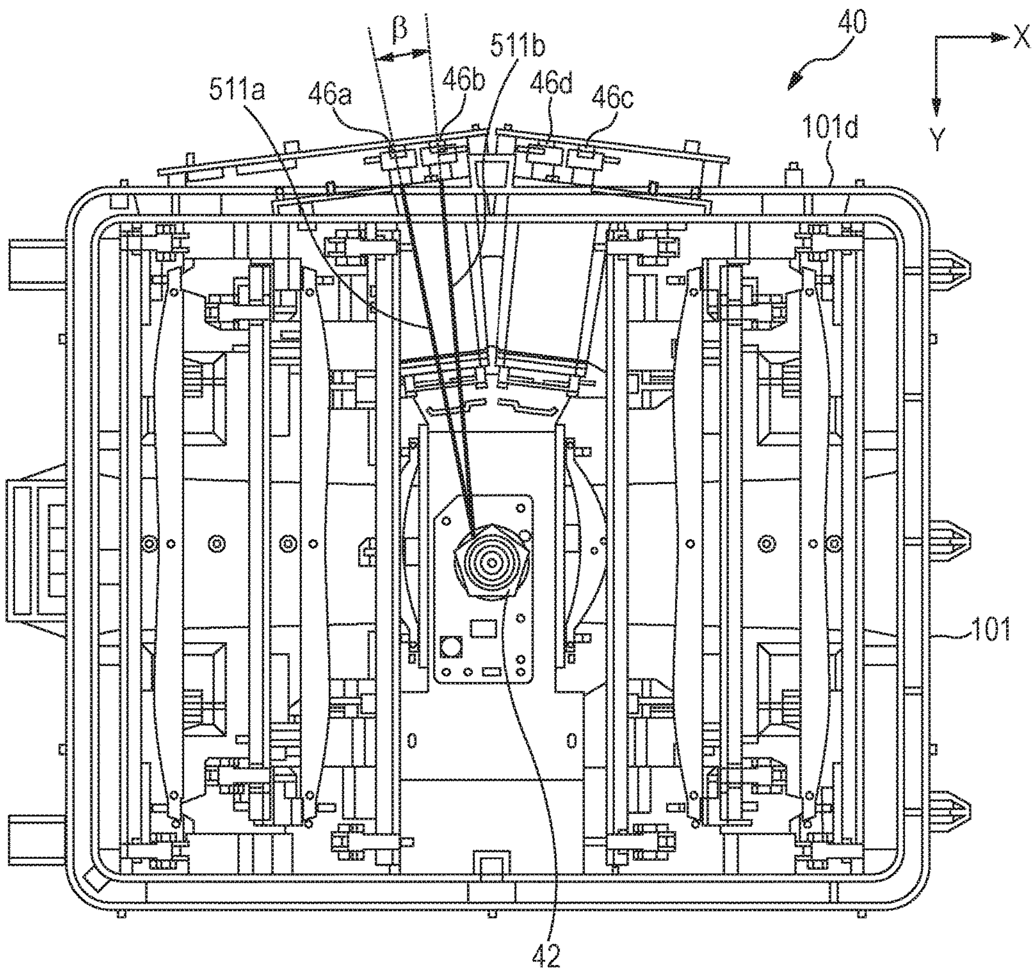
FIG. 6 is a diagram illustrating an angle $\beta$ in a main scanning direction of the light source according to the first embodiment.

In order to reduce the size of the housing 101 as small as possible, the light scanning apparatus 40 is configured as described below. The size of the housing 101 is determined such that a length of the reflection mirror 62 is set to a necessary and sufficient length so that the reflection mirror 62 guides the laser light to the surface to be scanned, and the size of the housing 101 has a minimum size required to house the reflection mirror 62. The light source 51 is arranged to match the side wall portion 101*d* in the housing 101 having such a size. As a result, it is possible to compactly reduce the size of the whole light scanning apparatus 40. FIG. 6 is a schematic diagram illustrating the light scanning apparatus 40 as seen from the upper side (+Z direction) of the light scanning apparatus 40. The light source 51 is held in the chip holder 46. As illustrated in FIG. 6, the chip holder 46 is arranged in the side wall portion 101*d* of the housing 101.

According to the first embodiment, for example, the light source 51 has eight light emitting points having an outer diameter of $\phi$11.6. In order to arrange the light source 51 on the side wall portion 101*d* of the housing 101, it is necessary to increase the angular difference between a pair of light sources 51. This is because interference between a pair of light source units 47 can be prevented when the angular difference between a pair of the light sources 51 arranged in the same light source unit 47 is provided only in the sub-scanning direction (Z-axis direction). Here, the light path of the laser light emitted from the light source 51*a* will be referred to as a light path 511*a* as a first light path, and the light path of the laser light emitted from the light source 51*b* will be referred to as a light path 511*b* as a second light path. The angular difference between a pair of light sources 51 refers to an angle between the light paths 511*a* and 511*b*. As the angular difference between the light paths 511*a* and 511*b* of the pair of light sources 51 in the sub-scanning direction increases, the reflection surface of the rotary polygon mirror 42 becomes distant from an ideal position.

Therefore, an error of the position where the laser light arrives on the photosensitive drum 50 increases. As a result, image quality is degraded. For example, an irradiation position of the laser light on the photosensitive drum 50 deviates due to surface eccentricity of the rotary polygon mirror 42.

In order to reduce the angular difference between the light paths 511*a* and 511*b* of the light sources 51*a* and 51*b* in the sub-scanning direction, it is assumed that the light source unit 47 is disposed apart from the rotary polygon mirror 42. Then, it is necessary to separate the side wall portion 101*d* where the light source unit 47 of the light scanning apparatus 40 is provided from the rotary polygon mirror 42. That is, the size of the housing 101 in the Y-axis direction increases. Therefore, in order to reduce the size of the light scanning apparatus 40 as small as possible while guaranteeing sufficient necessary image quality, the light source unit 47 is arranged to emit the laser light such that an angular difference is also provided in the main scanning direction. As a result, it is possible to bring the side wall portion 101*d* of the housing 101 closer to the rotary polygon mirror 42 and reduce the size of the housing 101 in the Y-axis direction. An angle β as a second angle illustrated in FIG. 6 refers to an angular difference between the chip holder 46*a* as a first holder and the chip holder 46*b* as a second holder mounted on the same light source unit 47 in the main scanning direction. The angle β of the main scanning direction is an angle between the light path 511*a* (dotted line) and the light path 511*b* (dotted line) in the main scanning direction.

Figure 7:
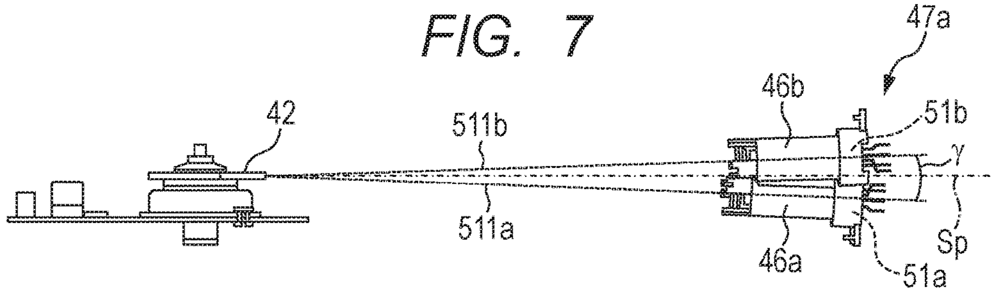
FIG. 7 is a diagram illustrating an angle $\gamma$ in a sub-scanning direction of the light source according to the first embodiment.

FIG. 7 is a schematic diagram illustrating the chip holders 46*a* and 46*b* mounted on the same light source unit 47*a* and the rotary polygon mirror 42 as seen from the X-axis direction. The light source unit 47*a* has a pair of chip holders 46*a* and 46*b*. The chip holder 46*a* has the light source 51*a*, and the chip holder 46*b* has the light source 51*b*. The light source unit 47*a* will be described below in more details. In order to miniaturize the light scanning apparatus 40, four laser lights emitted from the four light sources 51 are deflected by a single rotary polygon mirror 42. The laser lights emitted from the light sources 51*a* and 51*b* and the laser lights emitted from the light sources 51*c* and 51*d* are scanned in the opposite direction with respect to a plane parallel to the YZ-plane through the rotation axis of the rotary polygon mirror 42. The light sources 51*a* and 51*b* are scanned in the same direction using the rotary polygon mirror 42. A virtual plane that is perpendicular to the rotation axis of the rotary polygon mirror 42 and passes through the reflection surface of the rotary polygon mirror 42 is set as a virtual plane Sp (one-dotted chain line). For example, the light source 51*a* is arranged such that the laser light emitted from the light source 51*a* is incident to the reflection surface of the rotary polygon mirror 42 from the downside with respect to the virtual plane Sp. For example, the light source 51*b* is arranged such that the laser light emitted from the light source 51*b* is incident to the reflection surface of the rotary polygon mirror 42 from the upside with respect to a plane passing through the virtual plane Sp. An angle γ as a first angle is an angle between the light paths 511*a* and 511*b* in the sub-scanning direction. The light sources 51*a* and 51*b* are arranged in mutually different sides with respect to the virtual plane Sp traversing a plurality of reflection surfaces by setting the rotation axis of the rotary polygon mirror 42 as a normal line.

The chip holder 46*a* as the first holder and the chip holder 46*b* as the second holder are attached to mutually different positions in the rotation axis direction of the rotary polygon mirror 42 and the optical axis direction of the lens. The chip holder 46*a* is arranged in the bottom surface side of the housing 101 relative to the chip holder 46*b*. The chip holders 46*a* and 46*b* are attached to the housing 101 such that a first incident light path (first light path 511*a*) of the laser light emitted from the light source 51*a* and incident to the rotary polygon mirror 42 is placed between a second incident light path (second light path 511*b*) of the laser light emitted from the light source 51*b* and incident to the rotary polygon mirror 42 and the optical lens 60*a*. In addition, the chip holders 46*a* and 46*b* are attached to the housing 101 such that a part of the chip holder 46*a* and a part of the chip holder 46*b* overlap one another in the rotation axis direction of the rotary polygon mirror 42. Specifically, a part of the upper end of the chip holder 46*a* and a part of the lower end of the chip holder 46*b* overlap one another in the rotation axis direction of the rotary polygon mirror 42. At least in the rotation axis direction of the rotary polygon mirror 42, a part of the upper end of the lens barrel portion of the chip holder 46*a* and a part of the lower end of the lens barrel portion of the chip holder 46*b* overlap one another. The lens barrel portion is a tubular portion that connects a portion for holding the collimator lens 53*a* (53*b*) and a portion for holding the light source 51*a* (51*b*) to each other. That is, the chip holders 46*a* and 46*b* are arranged to incline with respect to a rotation axis of the rotary polygon mirror 42. For this reason, the light scanning apparatus 40 can be designed in a small size in the rotation axis direction of the rotary polygon mirror 42, compared to a light scanning apparatus in which a pair of chip holders are juxtaposed in the rotation axis direction of the rotary polygon mirror 42.

The light source 51*a* is provided under the virtual plane Sp so as to have an angle γ/2 with respect to the virtual plane Sp in the sub-scanning direction (Z-axis direction). The light source 51*b* is provided over the virtual plane Sp so as to have an angle γ/2 with respect to the virtual plane Sp in the sub-scanning direction (Z-axis direction). The angle γ/2 is designed, for example, to be equal to or smaller than 3° in order to miniaturize the housing 101 and reduce the surface eccentricity of the rotary polygon mirror 42. That is, the angle γ is designed, for example, to be larger than 0° and equal to or smaller than 6°. Note that the angle γ may be set to "0°" depending on applications. In this case, in FIG. 7, the light paths 511*a* and 511*b* become parallel to each other. For this reason, it is necessary to use a rotary polygon mirror having a reflection surface placed on the light paths 511*a* and 511*b*. In addition, it is necessary to perform design for a case where the light paths of the laser lights deflected by the rotary polygon mirror are set to zero (γ=0°). In the case of γ=0°, the reflection surface may have a two-stage configuration such that a rotary polygon mirror having different reflection surfaces placed on the light paths 511*a* and 511*b* may be employed, or a rotary polygon mirror having the same reflection surface placed on the light paths 511*a* and 511*b* may be employed.

In a pair of light sources 51*a* and 51*b* mounted on the same light source unit 47*a*, the chip holders 46*a* and 46*b* are arranged to have the following positional relationship. The chip holder 46*a* has the light source 51*a* that emits laser light directed to the photosensitive drum 50Y arranged outside of the light scanning apparatus 40 with respect to the rotary polygon mirror 42. The chip holder 46*a* is arranged in a direction (−Z direction) opposite to the direction (+Z direction) directed from the light scanning apparatus 40 to the photosensitive drum 50Y, compared to the other chip holder 46*b*.

The laser lights directed to a pair of photosensitive drums 50M and 50C arranged in the vicinity of the center of the width direction (X direction) of the image forming apparatus out of a plurality of photosensitive drums 50 are finally reflected by the reflection mirrors 62*d* and 62*g* inside the light scanning apparatus 40. The reflection mirrors 62*d* and 62*g* are arranged in the vicinity of the rotary polygon mirror 42. Furthermore, the reflection mirrors 62*d* and 62*g* are provided on the left surfaces 70*d* and 70*g* (refer to FIG. 2). In order to suppress image degradation caused by vibration of the reflection mirrors 62*d* and 62*g* by increasing a natural frequency of the reflection mirrors 62*d* and 66*g*, the left surfaces 70*d* and 70*g* are provided in the side wall portion 101*d* side of the housing 101 which has high stiffness. Furthermore, in a direction (Z direction) perpendicular to the installation surface of the light scanning apparatus 40, the left surface 70*d* of the reflection mirror 62 is arranged in the vicinity of the light source unit 47*a*. In particular, the chip holder 46*b* arranged closer to the +Z direction becomes closer to the left surface 70*d* of the reflection mirror 62*d* in the Z direction.

The laser light directed to the photosensitive drum 50 is not perpendicular to the installation surface of the light scanning apparatus 40 (parallel to the Z direction). As described above in conjunction with FIG. 4, an angle between a direction of the laser light LM directed from the reflection mirror 62*d*, where the laser light is finally reflected inside the light scanning apparatus 40, to the photosensitive drum 50M and the installation plane of the light scanning apparatus 40 becomes the angle $\alpha$ as illustrated in FIG. 1. According to the first embodiment, the angle $\alpha$ is set to be smaller than 90° ($0<\alpha<90°$). For example, if the angle $\alpha$ becomes 90°, the image forming engine 10 is provided immediately over the transparent window (not shown) provided in the light scanning apparatus 40, so that toner may fall down from the image forming engine 10, and the transparent window (not shown) may be easily polluted. In comparison, if the angle $\alpha$ is set to have a range $0<\alpha<90°$, the toner does not fall down to the transparent window (not shown), so that it is possible to address an imaging failure that may be generated when the laser light emitted from the light scanning apparatus 40 collides with the toner.

In this manner, the laser lights LM and LC emitted from the light scanning apparatus 40 are irradiated to the photosensitive drums 50M and 50C substantially at the same angle $\alpha$. For this reason, the left surface 70*d* of the reflection mirror 62*d* where the laser light LM is finally reflected inside the light scanning apparatus 40 becomes closer to the chip holder 46 relative to the left surface 70*b* of the reflection mirror 62*g* in the width direction (X direction) of the light scanning apparatus 40.

<Configuration of Light Source Unit>

Figure 8:
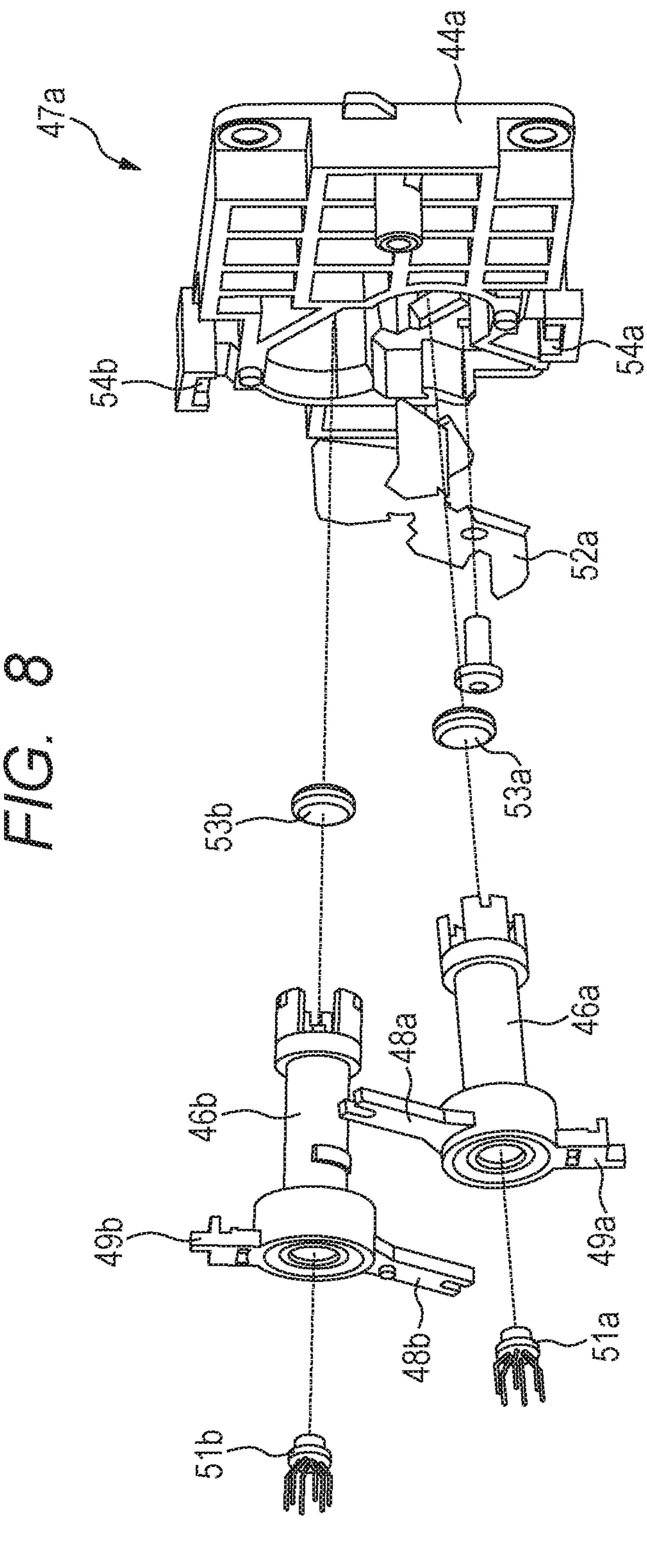
FIG. 8 is an exploded view illustrating vicinity of a light source unit as seen from the outside of the housing according to the first embodiment.
Figure 9:
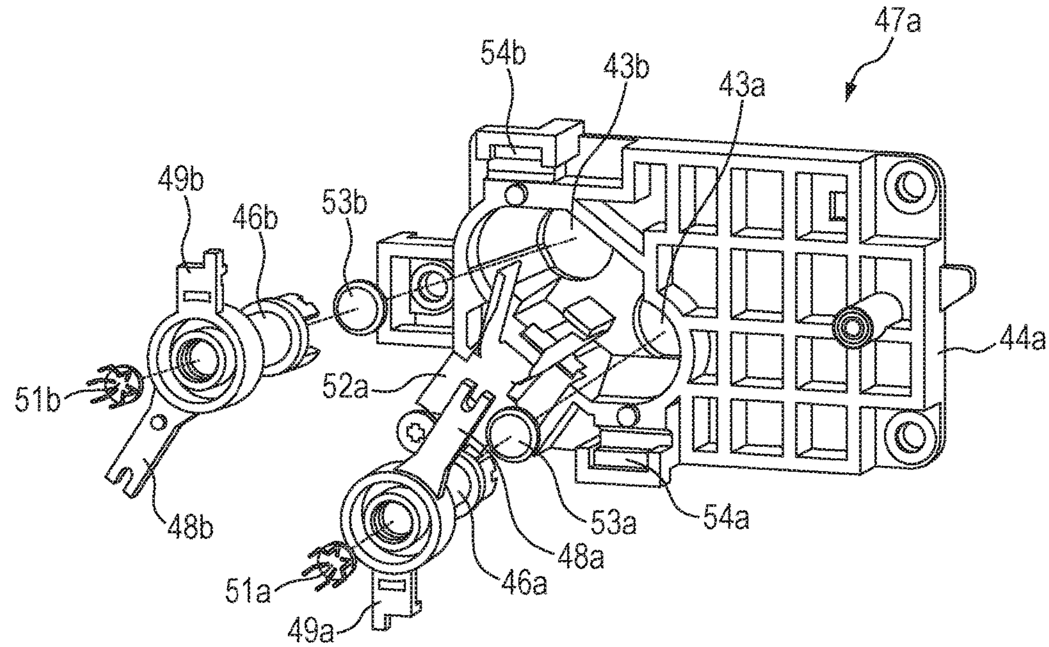
FIG. 9 is an exploded view illustrating vicinity of a light source unit as seen from the outside of the housing according to the first embodiment.
Figure 10:
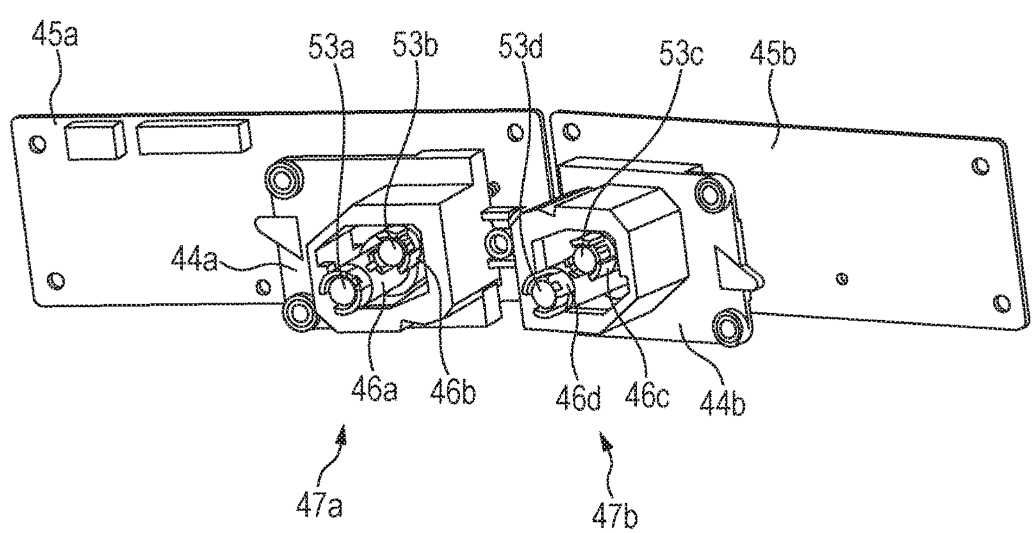
FIG. 10 is a perspective view illustrating a light source unit and a circuit board as seen from a rotary polygon mirror side according to the first embodiment.
Figure 11:
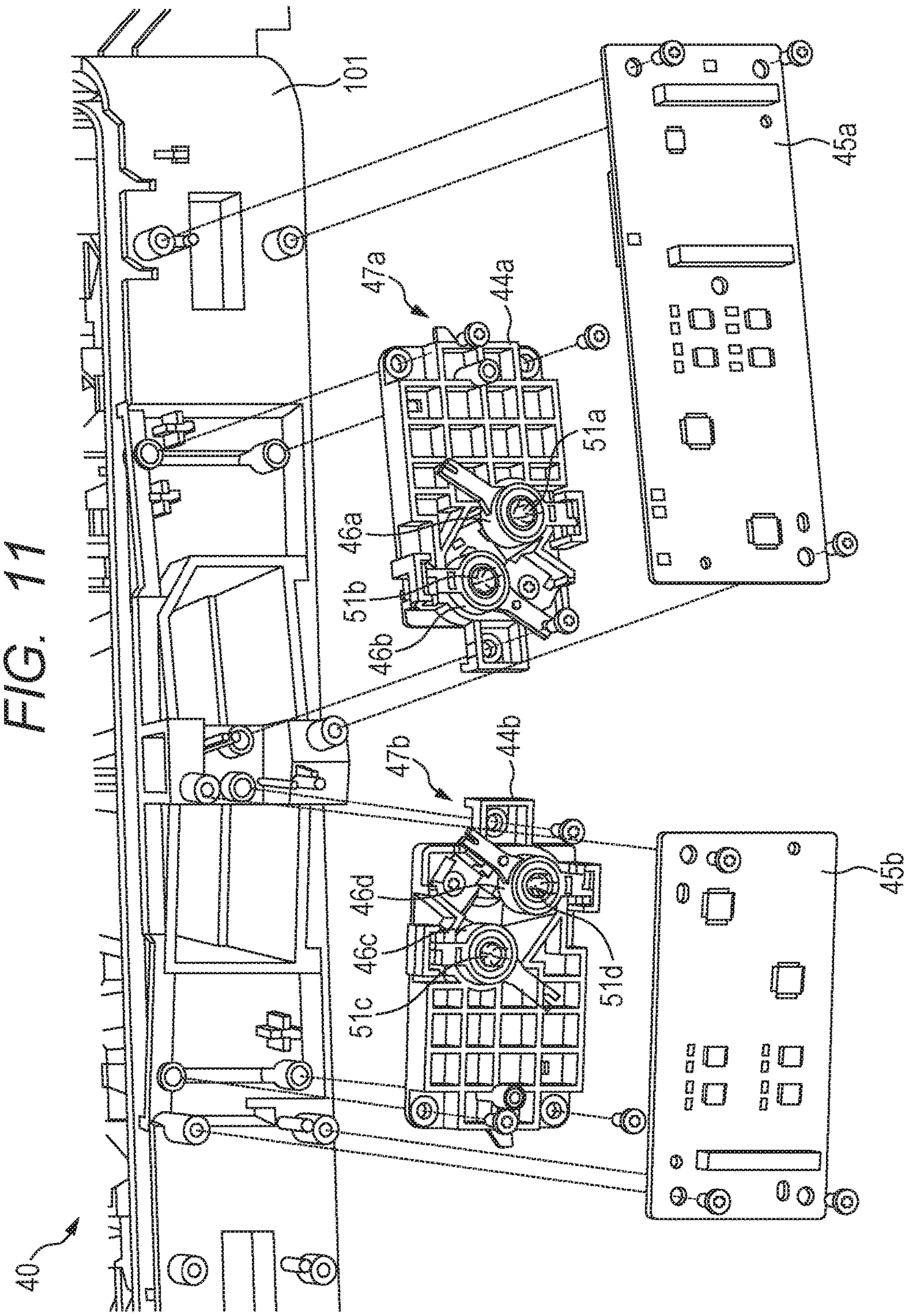
FIG. 11 is an exploded view illustrating vicinity of the light source unit as seen from a side surface side of the housing according to the first embodiment.

FIG. 8 is an exploded perspective view illustrating a configuration of the light source unit 47*a*. FIG. 9 is an exploded perspective view of FIG. 8 as seen from a different angle. FIG. 10 is a perspective view illustrating a state in which the laser holders 44*a* and 44*b* are attached to the circuit boards 45*a* and 45*b* as seen from the rotary polygon mirror 42 side. FIG. 11 is an exploded perspective view illustrating the housing 101 of the light scanning apparatus 40, the laser holders 44*a* and 44*b*, and the circuit boards 45*a* and 45*b* as seen from the outside of the housing 101. The left side of FIG. 8 becomes the external side of the light scanning apparatus 40, and the right side of FIG. 8 becomes the rotary polygon mirror 42 side. The light sources 51*a* and 51*b* are laser chips having, for example, eight (or four) light emitting points. The light sources 51*a* and 51*b* are pressedly inserted into the chip holders 46*a* and 46*b*, respectively, formed of resin. The chip holders 46*a* and 46*b* have an adjustment protrusion 48*a* as a first protrusion and an adjustment protrusion 48*b* as a second protrusion, respectively, in the side where the light sources 51*a* and 51*b* are pressedly inserted. The adjustment protrusions 48*a* and 48*b* are protrusions gripped when the chip holders 46*a* and 46*b* are rotated. The adjustment protrusions 48*a* and 48*b* are used, for example, in a factory to control an interval between the scanning positions of the laser lights emitted from each light emitting point of the light sources 51*a* and 51*b* on the photosensitive drum 50 depending on an image resolution. The chip holders 46*a* and 46*b* have fixing portions 49*a* and 49*b* in the side where the light sources 51*a* and 51*b* are pressedly inserted. The fixing portions 49*a* and 49*b* are used to fix the chip holders 46*a* and 46*b* to the laser holder 44*a*. The laser holder 44*a* has receiving portions 54*a* and 54*b*. The fixing portion 49*a* of the chip holder 46*a* is bonded and fixed to the receiving portion 54*a* of the laser holder 44*a*. The fixing portion 49*b* of the chip holder 46*b* is bonded and fixed to the receiving portion 54*b* of the laser holder 44*a*. In the chip holders 46*a* and 46*b*, the collimator lenses 53*a* and 53*b* are attached to an end portion opposite to the end portion where the light sources 51*a* and 51*b* are pressedly inserted.

The chip holders 46*a* and 46*b* mounted with the light sources 51*a* and 51*b* and the collimator lenses 53*a* and 53*b* are attached to a single laser holder 44*a*. The laser holder 44*a* is inserted into openings 43*a* and 43*b* provided in the laser holder 44*a* from the collimator lenses 53*a* and 53*b* side. A plate spring 52*a* is inserted between the chip holders 46*a* and 46*b* attached to the laser holder 44*a*. The chip holders 46*a* and 46*b* are fixed to the laser holder 44*a* by virtue of an elastic force of the plate spring 52*a* so as not to move inside the laser holder 44*a*. Note that, although the chip holders 46*a* and 46*b* are attached to the laser holder 44*a* separate from the housing 101 in the embodiment, the chip holders 46*a* and 46*b* may be directly attached to the housing 101. If the chip holders 46*a* and 46*b* are directly attached to the housing 101, a structure such as the laser holder 44*a* illustrated in FIG. 8 (portions relating to attachment of the chip holders 46*a* and 46*b*) is integrally formed on the side wall of the housing 101.

The laser holder 44*a* to which a pair of chip holders 46*a* and 46*b* are attached is attached between the housing 101 and the circuit board 45*a* using screws or the like as illustrated in FIG. 11. Lead wires of the light sources 51*a* and 51*b* of the chip holders 46*a* and 46*b* are electrically connected to the circuit board 45*a* through soldering. Note that this similarly applies to attachment of the light sources 51*c* and 51*d*, the chip holders 46*c* and 46*d*, and the laser holder 44*b*, and it will not be described repeatedly. However, the chip holder 46*c* is arranged over the virtual plane Sp (refer to FIG. 7) to be distant from the rotary polygon mirror 42 relative to the chip holder 46*d* in the X-axis direction. In addition, the chip holder 46*d* is arranged under the virtual plane Sp to be closer to the rotary polygon mirror 42 relative to the chip holder 46*c* in the X-axis direction. The chip holders 46*c* and 46*d* are attached to the housing 101 such that the third incident light path of the laser light emitted from the light source 51*c* and incident to the rotary polygon mirror 42 is placed between the fourth incident light path of the laser light emitted from the light source 51*d* and incident to the rotary polygon mirror 42 and the optical lens 60*c*. In addition, the chip holders 46*c* and 46*d* are attached to the housing 101 such that a part of the chip holder 46*c* and a part of the chip holder 46*d* overlap one another in the rotation axis direction of the rotary polygon mirror 42. The light sources 51*a* to 51*d* according to the first embodiment are arranged to match four corners of a parallelogram as seen from the rotary polygon mirror 42 side.

<Arrangement of Light Receiving Sensor>

Figure 12A:
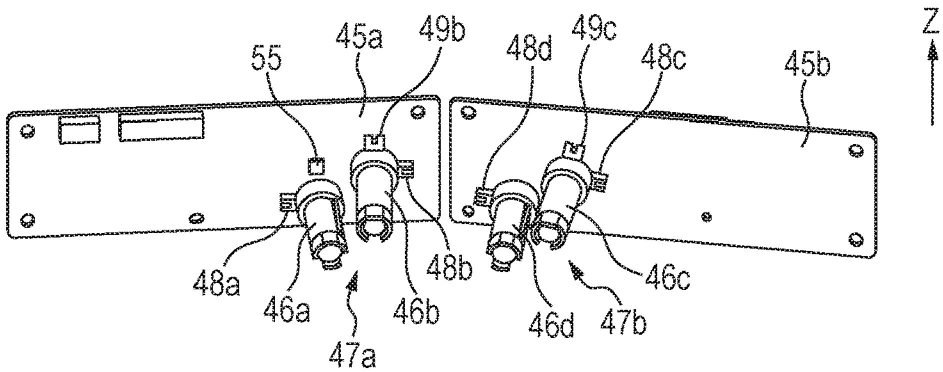
FIGS. 12A, 12B, and 12C are perspective views illustrating arrangement of a light source unit and a light receiving sensor according to the first embodiment.
Figure 12B:
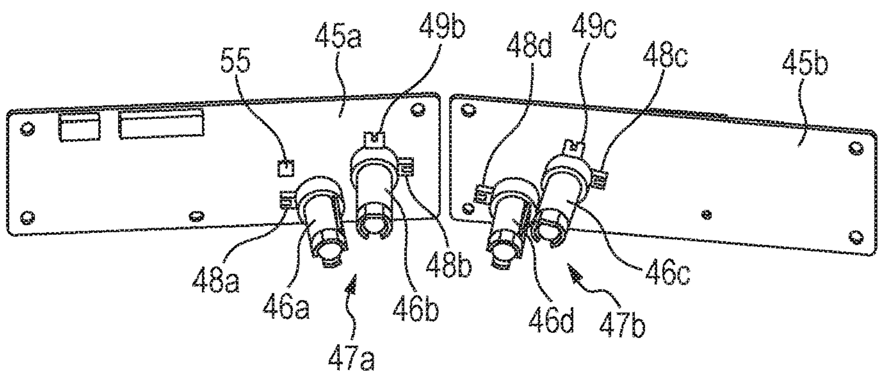
Figure 12C:
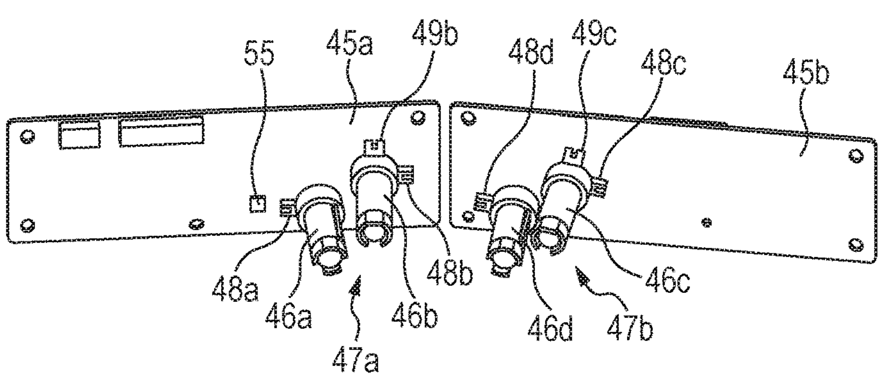

FIGS. 12A, 12B, and 12C are perspective views illustrating arrangement of the light source unit and the light receiving sensor according to the first embodiment. The circuit board 45*a* is a board where electric components for driving the light sources 51*a* and 51*b* and the light receiving sensor 55 are mounted. In order to implement the light scanning apparatus 40 compactly and inexpensively, the light scanning apparatus 40 according to the first embodiment drives the light sources 51*a* and 51*b* and the light receiving sensor 55 using the same circuit board 45*a*. The light receiving sensor 55 is arranged in a position where the laser light emitted from the light source 51*a* is reflected by the rotary polygon mirror 42, passes straightly, and then arrives. For example, when the laser light reflected by the rotary polygon mirror 42 and then reflected by another reflection mirror is guided to the light receiving sensor, the housing 101 may be deformed due to influence of heat, and the light path of the laser light incident to the light receiving sensor 55 may change. In this case, a position where the latent image starts to be formed on the photosensitive drum 50 (hereinafter, referred to as a latent image start position) may change. For this reason, according to the first embodiment, the laser light reflected by the rotary polygon mirror 42 is not reflected by the reflection mirror, but is directly guided to the light receiving sensor 55.

The rotational direction of the rotary polygon mirror 42 or the arrangement of the light receiving sensor 55 is determined such that the laser light reflected by the rotary polygon mirror 42 is received by the light receiving sensor 55, and is then irradiated to the photosensitive drum 50. A timing for starting formation of the latent image on each photosensitive drum 50 (hereinafter, referred to as a "write timing") is determined on the basis of the timing at which the laser light arrives at the light receiving sensor 55. As a result, it is possible to align the latent image start position on the photosensitive drum 50. The light receiving sensor 55 is arranged to satisfy these conditions.

Since the laser light reflected by the rotary polygon mirror 42 is incident to the light receiving sensor 55, it is necessary to prevent the chip holder 46 arranged in the vicinity of the light receiving sensor 55 from interfering with the laser light. The chip holder 46 has the adjustment protrusion 48 and the fixing portion 49. The adjustment protrusion 48 and the fixing portion 49 are arranged such that a pair of light sources 51 housed in a single light source unit 47 become distant from each other. Specifically, the chip holder 46*a* is arranged such that the adjustment protrusion 48*a* becomes distant from the chip holder 46*b*, and the fixing portion 49*a* becomes distant from the chip holder 46*b*. The chip holder 46*b* is arranged such that the adjustment protrusion 48*b* becomes distant from the chip holder 46*a*, and the fixing portion 49*b* becomes distant from the chip holder 46*a*. That is, the chip holders 46*a* and 46*b* are arranged as illustrated in FIG. 12A, 12B or 12C. This similarly applies to the chip holders 46*c* and 46*d*.

The adjustment protrusion 48 and the fixing portion 49 are arranged in this way for the two following reasons. First, using this arrangement, it is possible to design the receiving portion 54 for bonding the fixing portion 49 of the chip holder 46 to the laser holder 44. Second, using this arrangement, it is possible to secure a space for manipulating a tool when the adjustment protrusion 48 for controlling an interval of the laser light in the sub-scanning direction is manipulated with the tool.

Here, it is assumed that light scanning apparatus 40 is configured such that the laser light emitted from the chip holder 46 is received by the light receiving sensor 55. The laser light emitted from the light source 51*a* and reflected by the rotary polygon mirror 42 is necessarily incident to the light receiving sensor 55 without colliding with the adjustment protrusion 48*a* and the fixing portion 49*a* of the chip holder 46*a*.

FIGS. 12A to 12C illustrate the light source unit 47 when the laser light emitted from the chip holder 46*a* and reflected by the rotary polygon mirror 42 is received by the light receiving sensor 55. FIG. 12C is a diagram illustrating a case where the light receiving sensor 55 is arranged substantially in the same position as that of the adjustment protrusion 48*a* of the chip holder 46*a* in the sub-scanning direction, and is arranged to become distant from the chip holder 46*a* in the main scanning direction. As illustrated in FIG. 12C, in order to arrange the light receiving sensor 55 such that the laser light arriving at the light receiving sensor 55 does not collide with the adjustment protrusion 48*a*, it is necessary to increase a distance between the light source 51*a* and the light receiving sensor 55 in the main scanning direction.

FIG. 12A is a diagram illustrating a case where the light receiving sensor 55 is arranged over the light source 51*a* (chip holder 46*a*) of the chip holder 46*a* in the sub-scanning direction, and is arranged substantially in the same position as that of the chip holder 46*a* in the main scanning direction. As illustrated in FIG. 12A, the light receiving sensor 55 is arranged immediately over the light source 51*a* of the chip holder 46*a*. The light receiving sensor 55 is arranged substantially in the same position as that of the light source 51*a* in the main scanning direction. By arranging the light receiving sensor 55 as illustrated in FIG. 12A, it is possible to prevent the adjustment protrusion 48*a* and the fixing portion 49*a* from colliding with the laser light received by the light receiving sensor 55. For this reason, it is possible to reduce the distance between the chip holder 46*a* and the light receiving sensor 55. As a result, it is possible to improve a degree of freedom when the light receiving sensor 55 and the chip holder 46*a* are arranged in the circuit board 45*a*. That is, since the laser light emitted from the light source 51*a* and reflected by the rotary polygon mirror 42 directly arrives at the light receiving sensor 55, it is possible to miniaturize the light scanning apparatus 40.

In FIG. 12A, the light receiving sensor 55 is provided substantially in the same position as that of the light source 51*a* in the main scanning direction. Alternatively, for example, the light receiving sensor 55 may be arranged to become distant from the position of the light source 51*a* in the main scanning direction. FIG. 12B is a diagram illustrating a case where the laser light emitted from the chip holder 46*a* is received by the light receiving sensor 55. FIG. 12B illustrates a case where the light receiving sensor 55 is arranged over the adjustment protrusion 48*a* of the chip holder 46*a* in the sub-scanning direction and substantially in the same position as that of the adjustment protrusion 48*a* in the main scanning direction. As illustrated in FIG. 12B, the same effect as that of FIG. 12A is obtained even when the light receiving sensor 55 is arranged upward obliquely to the chip holder 46*a*. Note that the same effect is obtained even when the laser light emitted from the light source 51*b* of the chip holder 46*b* is received by the light receiving sensor 55 arranged as illustrated in FIGS. 12A and 12B. According to the first embodiment, it is possible to miniaturize the light scanning apparatus in the rotation axis direction of the rotary polygon mirror.

Second Embodiment

In the first embodiment, the cyan light source unit 47_c_ is arranged in a position higher than that of the black light source unit 47_d_ in the sub-scanning direction (Z-axis direction). In the first embodiment, the virtual line obtained by linking the four chip holders 46_a_ to 46_d_ has a parallelogram shape. According to the second embodiment, the chip holders 46_a_ and 46_b_ and the light receiving sensor 55 are arranged similarly to those of the first embodiment. However, according to the second embodiment, the chip holders 46_c_ and 46_d_ are arranged reversely to those of the first embodiment, and the chip holder 46_d_ is arranged to be higher than the chip holder 46_c_ in the sub-scanning direction (Z-axis direction). According to the second embodiment, the four chip holders 46_a_ to 46_d_ are arranged in the shape of an unfolded fan.

<Arrangement of Light Source>

Figure 13:
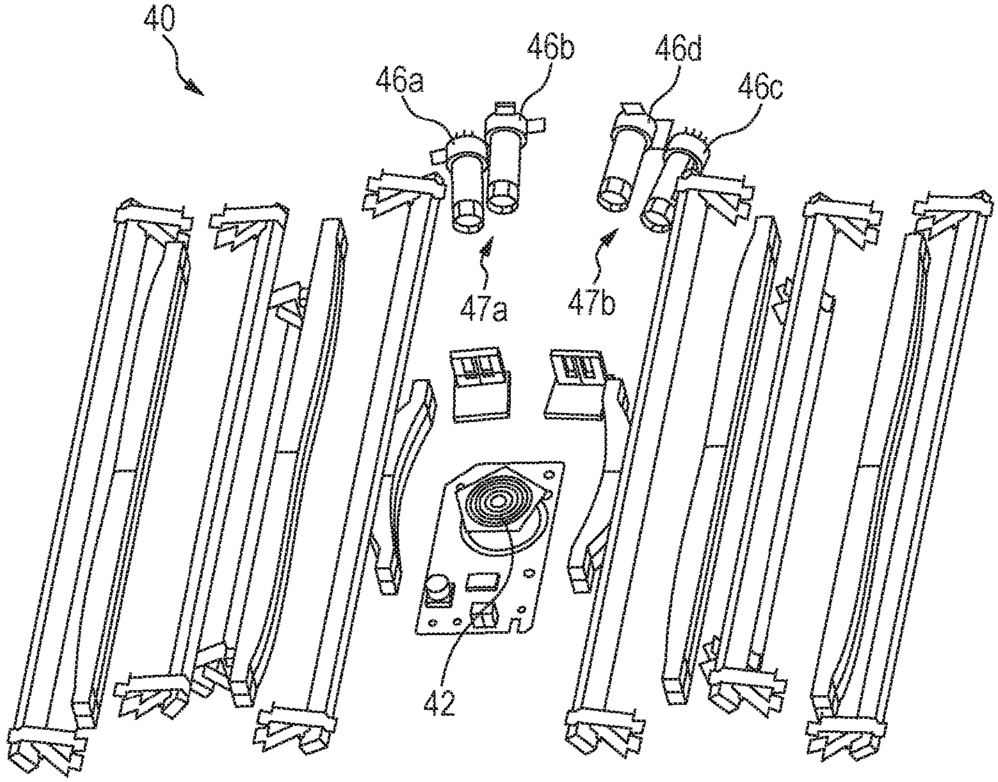
FIG. 13 is a perspective view illustrating main parts of a light scanning apparatus according to a second embodiment.
Figure 14:
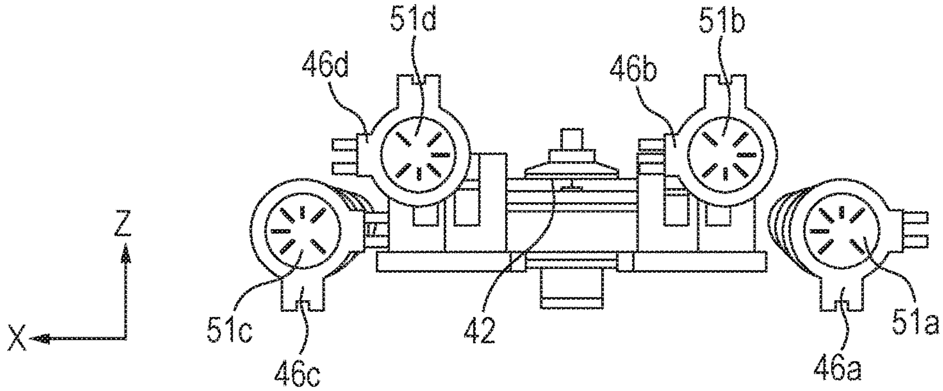
FIG. 14 is a diagram illustrating vicinity of the light source unit as seen from the outside of the housing according to the second embodiment.
Figure 15:
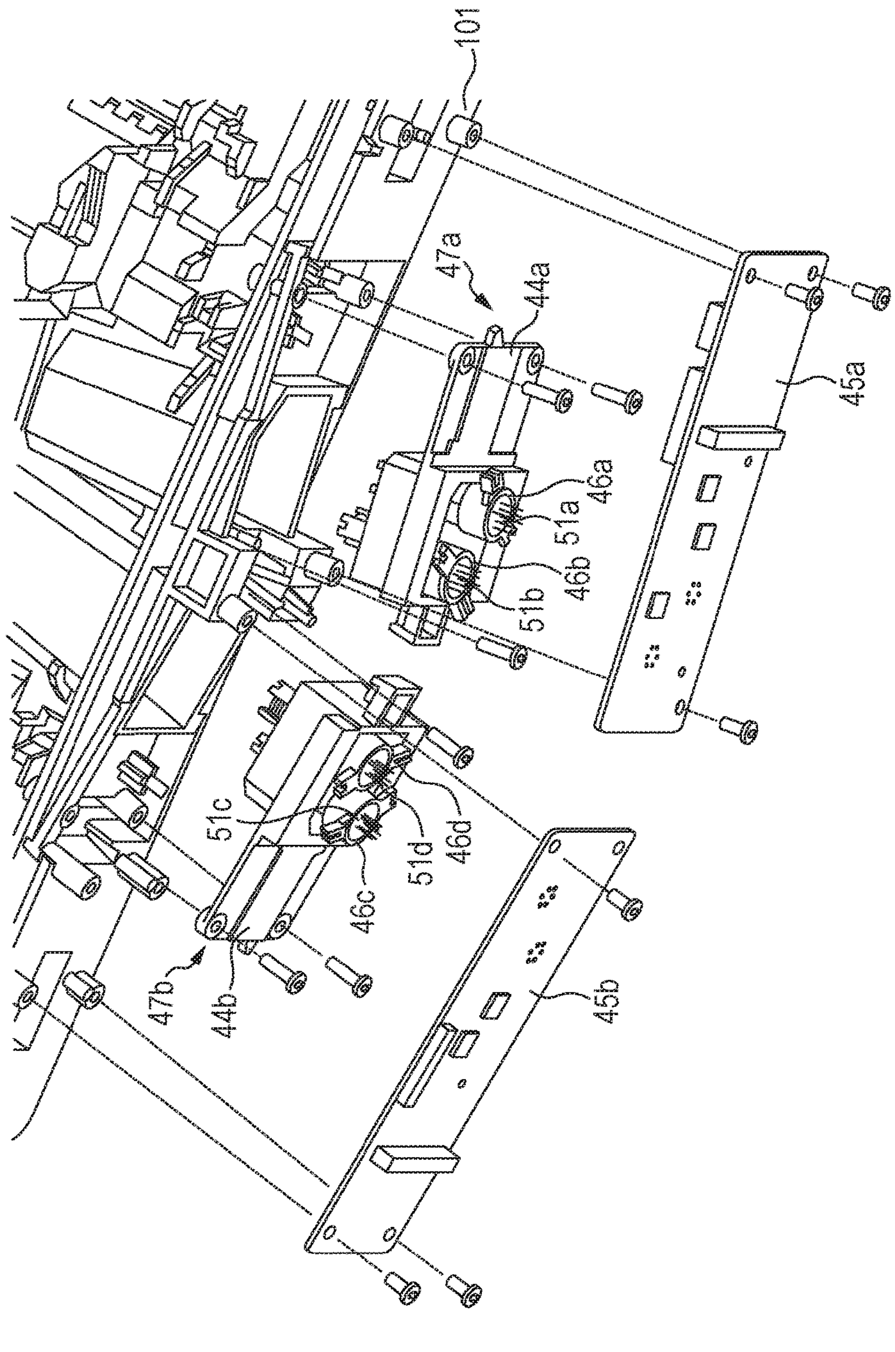
FIG. 15 is an exploded view illustrating vicinity of the light source unit as seen from a side surface side of the housing according to the second embodiment.

FIG. 13 is a schematic diagram illustrating main parts of the light scanning apparatus 40 by removing the housing 101 or the like. The chip holders 46_a_ and 46_b_ are arranged similarly to those of the first embodiment, but vertical positions of the chip holders 46_c_ and 46_d_ are different from those of the first embodiment in the sub-scanning direction. FIG. 14 is a schematic diagram illustrating the light scanning apparatus 40 as seen from the outside and shows only main parts. FIG. 15 is an exploded perspective view illustrating the housing 101, the laser holder 44, and the circuit board 45 of the light scanning apparatus 40 as seen from the outside of the light scanning apparatus 40. As illustrated in FIG. 14, the chip holders 46_a_ to 46_d_ are arranged in the shape of the unfolded fan as seen from the outside of the housing 101. That is, the chip holders 46_a_ and 46_b_ and the chip holders 46_c_ and 46_d_ are arranged plane-symmetrically to each other with respect to a plane parallel to the YZ-plane through the rotation axis of the rotary polygon mirror 42. Specifically, the chip holder 46_c_ is arranged under the virtual plane Sp and becomes distant from the rotary polygon mirror 42 relative to the chip holder 46_d_ in the X-axis direction. The chip holder 46_d_ is arranged over the virtual plane Sp and becomes closer to the rotary polygon mirror 42 relative to the chip holder 46_c_ in the X-axis direction.

As described above, according to the second embodiment, a pair of light sources 51 are held in a single light source unit 47, and a pair of light source units 47 are arranged symmetrically to the side wall portion 101_d_ of the housing 101 with respect to a plane parallel to the YZ-plane through the rotation axis of the rotary polygon mirror 42. One of the pair of light sources 51 of the single light source unit 47 having a larger incident angle in the main scanning direction is positioned under the other light source 51 in a vertical direction. As a result, according to the second embodiment, it is possible to miniaturize the light scanning apparatus in the rotation axis direction of the rotary polygon mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025996, filed Feb. 15, 2017, which is hereby incorporated by reference herein in its entirety.

What is claimed is:

1. A light scanning apparatus, comprising:

a plurality of optical elements including a mirror and a lens;

a housing configured to house the plurality of optical elements therein;

a first holder attached to the housing, and configured to hold a first laser light source having a plurality of light emitting points to emit first laser lights for exposing a first photosensitive member and a first collimator lens through which the first laser lights emitted from the first laser light source pass, wherein the first holder is configured to have a first lens barrel portion that connects a portion for holding the first laser light source and a portion for holding the first collimator lens;

a second holder attached to the housing, and configured to hold a second laser light source having a plurality of light emitting points to emit second laser lights for exposing a second photosensitive member and a second collimator lens through which the second leaser lights emitted from the second laser light source pass, wherein the second holder is configured to have a second lens barrel portion that connects a portion for holding the second laser light source and a portion for holding the second collimator lens;

a rotary polygon mirror configured to be rotated and provided with a plurality of reflection surfaces by which the first laser lights emitted from the first laser light source and the second laser lights emitted from the second laser light source are deflected; and a lens, of the plurality of optical elements, to which respective laser lights of the first laser lights emitted from the first laser light source and deflected by the rotary polygon mirror and the second laser lights emitted from the second laser light source and deflected by the rotary polygon mirror are first incident, wherein the first laser lights emitted from the first laser light source and the second laser lights emitted from the second laser light source are incident to a reflection surface of the rotary polygon mirror at respective angles inclined over and under a virtual plane that is perpendicular to a rotation axis of the rotary polygon mirror and passes through the plurality of reflection surfaces without being reflected by a mirror, wherein when viewing the first holder and the second holder from above the virtual plane in a rotation axis direction of the rotary polygon mirror, the first holder and the second holder are attached to the housing so that a first incident light path of the first laser lights incident to the rotary polygon mirror is placed between a second incident light path of the second laser lights incident to the rotary polygon mirror and the lens, and wherein in the rotation axis direction, a part of the first lens barrel portion and a part of the second lens barrel portion overlap one another.

2. The light scanning apparatus according to claim 1, further comprising a light receiving portion that receives the first laser lights emitted from the first laser light source and deflected by the rotary polygon mirror to generate a synchronization signal, wherein the light receiving portion is arranged in a different position from a position of the first holder in the rotation axis direction, and wherein when viewing the light receiving portion from above the virtual plane in the rotation axis direction, the light receiving portion is arranged in a position for receiving the first laser lights emitted from the first laser light source and deflected by the rotary polygon mirror to scan between the second incident light path and the lens without being reflected by a mirror.

3. The light scanning apparatus according to claim 2, wherein the light receiving portion is arranged in a side by side manner with the first lens barrel portion in the rotation axis direction.

4. The light scanning apparatus according to claim 3, further comprising a circuit board on which the first laser light source and the second laser light source are mounted, wherein the first holder has a first protrusion to be gripped when the first holder is rotated in order to adjust an interval between scanning positions of the first laser lights emitted from the plurality of light emitting points of the first laser light source on the first photosensitive member in a rotational direction of the first photosensitive member, wherein the second holder has a second protrusion to be gripped when the second holder is rotated in order to adjust an interval between scanning positions of the second laser lights emitted from the plurality of light emitting points of the second laser light source on the second photosensitive member in a rotational direction of the second photosensitive member, wherein the first holder is mounted on the circuit board so that the first protrusion is positioned to be distant from the second holder, and wherein the second holder is mounted on the circuit board so that the second protrusion is positioned to be distant from the first holder.

5. The light scanning apparatus according to claim 4, wherein the light receiving portion is mounted on the circuit board.

6. The light scanning apparatus according to claim 1, further comprising:

a third holder attached to the housing, and configured to hold a third laser light source having a plurality of light emitting points to emit third laser lights for exposing a third photosensitive member and a third collimator lens through which the third laser lights emitted from the third laser light source pass, wherein the third holder is configured to have a third lens barrel portion that connects a portion for holding the third laser light source and a portion for holding the third collimator lens;

a fourth holder attached to the housing and configured to hold the fourth laser light source having a plurality of light emitting points to emit fourth laser lights for exposing a fourth photosensitive member and a fourth collimator lens through which the fourth laser lights emitted from the fourth laser light source pass, wherein the fourth holder is configured to have a fourth lens barrel portion that connects a portion for holding the fourth laser light source and a portion for holding the fourth collimator lens; and an other lens, of the plurality of optical elements, to which respective laser lights of the third laser lights emitted from the third laser light source and deflected by the rotary polygon mirror and the fourth laser lights emitted from the fourth laser light source and deflected by the rotary polygon mirror are first incident, wherein the third laser lights emitted from the third laser light source and the fourth laser lights emitted from the fourth laser light source are incident to a reflection surface of the rotary polygon mirror at respective angles inclined over and under the virtual plane that is perpendicular to the rotation axis of the rotary polygon mirror and passes through the plurality of reflection surfaces without being reflected by a mirror, wherein when viewing the third holder and the fourth holder from above the virtual plane in the rotation axis direction, the third holder and the fourth holder are attached to the housing so that a third incident light path of the third laser lights incident to the rotary polygon mirror is placed between a fourth incident light path of the fourth laser lights incident to the rotary polygon mirror and the other lens, wherein in the rotation axis direction, a part of the third lens barrel portion and a part of the fourth lens barrel portion overlap one another.

7. The light scanning apparatus according to claim 1, wherein the first laser light source and the second laser light source are arranged in mutually different sides with respect to a virtual plane that is perpendicular to a rotation axis of the rotary polygon mirror and passes through the plurality of reflection surfaces.

8. The light scanning apparatus according to claim 7, wherein the first holder and the second holder are attached to the housing so that an angle between the first incident light path and the virtual plane and an angle between the second incident light path and the virtual plane are larger than 0° and equal to or smaller than 3°.

9. The light scanning apparatus according to claim 7, wherein the first holder is arranged in a bottom surface side of the housing relative to the second holder.

10. The light scanning apparatus according to claim 6, wherein the first laser light source and the second laser light source are arranged in mutually different sides with respect to the virtual plane, and wherein the third laser light source and the fourth laser light source are arranged in mutually different sides with respect to the virtual plane.

11. The light scanning apparatus according to claim 10, wherein the first holder, the second holder, the third holder, and the fourth holder are attached to the housing so that an angle between the first incident light path and the virtual plane, an angle between the second incident light path and the virtual plane, an angle between the third incident light path and the virtual plane, and an angle between the fourth incident light path and the virtual plane are larger than 0° and equal to or smaller than 3°.

12. An image forming apparatus, comprising:

a first photosensitive member;

a second photosensitive member;

a light scanning apparatus comprising:

a plurality of optical elements including a mirror and a lens, a housing configured to house the plurality of optical elements therein, a first holder attached to the housing, and configured to hold a first laser light source having a plurality of light emitting points to emit first laser lights so as to form a latent image on the first photosensitive member and a first collimator lens through which the first laser lights emitted from the first laser light source pass, wherein the first holder is configured to have a first lens barrel portion that connects a portion for holding the first laser light source and a portion for holding the first collimator lens, a second holder attached to the housing, and configured to hold a second laser light source having a plurality of light emitting points to emit second laser lights so as to form a latent image on the second photosensitive member and a second collimator lens through which the second leaser lights emitted from the second laser light source pass, wherein the second holder is configured to have a second lens barrel portion that connects a portion for holding the second laser light source and a portion for holding the second collimator lens, a rotary polygon mirror configured to be rotated and provided with a plurality of reflection surfaces by which the first laser lights emitted from the first laser light source and the second laser lights emitted from the second laser light source are deflected, and a lens, of the plurality of optical elements, to which the first laser lights emitted from the first laser light source and deflected by the rotary polygon mirror and the second laser lights emitted from the second laser light source and deflected by the rotary polygon mirror are first incident, wherein the first laser lights emitted from the first laser light source and the second laser lights emitted from the second laser light source are incident to a reflection surface of the rotary polygon mirror at respective angles inclined over and under a virtual plane that is perpendicular to a rotation axis of the rotary polygon mirror and passes through the plurality of reflection surfaces without being reflected by a mirror, wherein when viewing the first holder and the second holder from above the virtual plane in a rotation axis direction of the rotary polygon mirror, the first holder and the second holder are attached to the housing so that a first incident light path of the first laser lights incident to the rotary polygon mirror is placed between a second incident light path of the second laser lights incident to the rotary polygon mirror and the lens, and wherein in the rotation axis direction, a part of the first lens barrel portion and a part of the second lens barrel portion overlap one another;

the image forming apparatus further comprising:

a first developing device configured to develop the latent image formed on the first photosensitive member to form a toner image;

a second developing device configured to develop the latent image formed on the second photosensitive member to form a toner image;

a first transfer member configured to transfer the toner image formed by the first developing device to a transfer-receiving member; and a second transfer member configured to transfer the toner image formed by the second developing device to the transfer-receiving member.

13. The image forming apparatus according to claim 12, wherein an angle between the first laser lights emitted from the first laser light source and directed from the light scanning apparatus to the first photosensitive member and an installation surface on which the light scanning apparatus is installed is smaller than 90°, and wherein an angle between the second laser lights emitted from the second laser light source and directed from the light scanning apparatus to the second photosensitive member and the installation surface is smaller than 90°.

14. The image forming apparatus according to claim 12, further comprising a light receiving portion that receives the first laser lights emitted from the first laser light source and deflected by the rotary polygon mirror to generate a synchronization signal, wherein the light receiving portion is arranged in a different position from a position of the first holder in the rotation axis direction, and wherein when viewing the light receiving portion from above the virtual plane in the rotation axis direction, the light receiving portion is arranged in a position for receiving the first laser lights emitted from the first laser light source and deflected by the rotary polygon mirror to scan between the second incident light path and the lens without being reflected by a mirror.

15. The image forming apparatus according to claim 1, wherein in an optical axis direction of the lens, the first lens barrel portion and the second lens barrel portion are disposed with a space therebetween and are offset from each other.

16. The image forming apparatus according to claim 6, wherein in an optical axis direction of the lens, the first lens barrel portion and the second lens barrel portion are disposed with a space therebetween and are offset from each other.

17. The image forming apparatus according to claim 12, wherein in an optical axis direction of the lens, the first lens barrel portion and the second lens barrel portion are disposed with a space therebetween and are offset from each other.

* * * * *